US007476542B2

(12) United States Patent
Walker et al.

(10) Patent No.: US 7,476,542 B2
(45) Date of Patent: *Jan. 13, 2009

(54) METHOD AND APPARATUS FOR VIDEO POKER USING ALTERNATE DRAW STRATEGIES

(75) Inventors: Jay S. Walker, Ridgefield, CT (US); James A. Jorasch, New York, NY (US); Magdalena M. Fincham, Ridgefield, CT (US); Geoffrey M. Gelman, Brooklyn, NY (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/695,167

(22) Filed: Apr. 2, 2007

(65) Prior Publication Data

US 2007/0184889 A1 Aug. 9, 2007

Related U.S. Application Data

(63) Continuation of application No. 10/202,192, filed on Jul. 23, 2002, now Pat. No. 7,201,655, which is a continuation-in-part of application No. 09/109,839, filed on Jul. 2, 1998, now Pat. No. 6,422,940.

(51) Int. Cl.
*G06F 17/00* (2006.01)
*G06F 19/00* (2006.01)

(52) U.S. Cl. ............................ 436/13; 463/11; 463/16; 463/25; 273/292

(58) Field of Classification Search .................. 463/11, 463/13, 16, 25; 273/292
See application file for complete search history.

(56) References Cited

U.S. PATENT DOCUMENTS

| | | | | |
|---|---|---|---|---|
| 5,022,653 | A | 6/1991 | Suttle et al. | 273/85 CP |
| 5,033,744 | A | 7/1991 | Bridgeman et al. | 273/85 CP |
| 5,123,649 | A | 6/1992 | Tiberio | 273/143 R |
| 5,294,120 | A | 3/1994 | Schultz | 273/85 CP |
| 5,370,399 | A | 12/1994 | Liverance | 273/434 |
| 5,401,023 | A | 3/1995 | Wood | 273/85 CP |
| 5,415,404 | A | 5/1995 | Joshi et al. | 273/138 A |
| 5,511,781 | A | 4/1996 | Wood et al. | 273/85 CP |
| 5,542,669 | A | 8/1996 | Charron et al. | 463/13 |
| 5,630,753 | A | 5/1997 | Fuchs | 463/9 |
| 5,851,147 | A | 12/1998 | Stupak et al. | 463/13 |
| 6,126,541 | A | 10/2000 | Fuchs | 463/13 |
| 6,334,613 | B1 * | 1/2002 | Yoseloff | 273/292 |
| 6,343,989 | B1 * | 2/2002 | Wood et al. | 463/23 |
| 6,537,150 | B1 * | 3/2003 | Luciano et al. | 463/16 |

(Continued)

OTHER PUBLICATIONS

Website: "ZDNet Software Library—Blackjack Simulation", by DiamondSoft, Feb. 29, 1996, (wysiwyg //10/http //hotfiles zdnet . . . bin/texis/swlib/hotfiles/info htm). 1 pg.

(Continued)

*Primary Examiner*—Robert Pezzuto
*Assistant Examiner*—Milap Shah

(57) ABSTRACT

In accordance with one or more embodiments of the present invention, a method is provided that comprises determining a first strategy for play of a game and a second strategy for play of the game, selecting at least one final outcome of the game that cannot result from the first strategy, and increasing a payout ratio associated with the selected at least one final outcome.

22 Claims, 20 Drawing Sheets

U.S. PATENT DOCUMENTS

2002/0125641 A1 * 9/2002 Moody ....................... 273/292

OTHER PUBLICATIONS

Website: "ZDNet Software Library—Ne Plus Ultra Blackjack Practicum", Ne Plus Ultra Software Inc., Feb. 29, 1996, (wysiwyg //14/http //hotfiles zdnet . . . bin/texis/swlib/hotfiles/info htm). 1 pg.

Marting, Keith, "ZDNet Software Library—SimJack", Feb. 29, 1996, (wysiwyg //12/http //hotfiles zdnet . . . bin/texis/swlib/hotfiles/info htm).1 pg.

Website: "ZDNet Software Library—$mart Gambler", PC Information Systems, Feb. 29, 1996, (wysiwyg //4/http //hotfiles zdnet . . . bin/texis/swlib/hotfiles/info htm). 1 pg.

Website: "ZDNet Software Library—Blackjack Plus for Windows", Musicode Software, Sep. 17, 1996, (wysiwyg //13/http //hotfiles zdnet . . . bin/texis/swlib/hotfiles/info htm). 1 pg.

Website: "ZDNet Software Library—Ultimate Blackjack", Accidental Software, Apr. 29, 1997, (http //hotfiles zdnet com/cgi-bin/texis/swlib/hotfiles/info html?fcode=0000T5). 1 pg.

* cited by examiner

200

| | HAND GROUPING 220 | PAYOUT RATIO 222 |
|---|---|---|
| 202 | PAIR JACKS OR BETTER | 1 |
| 204 | TWO PAIR | 2 |
| 206 | THREE OF A KIND | 3 |
| 208 | STRAIGHT | 4 |
| 210 | FLUSH | 6 |
| 212 | FULL HOUSE | 9 |
| 214 | FOUR OF A KIND | 25 |
| 216 | STRAIGHT FLUSH | 50 |
| 218 | ROYAL FLUSH | 250 |

FIG. 2

300

| | HAND GROUPING 320 | PAYOUT RATIO FOR 1-4 COIN WAGER AMOUNT 322 | PAYOUT RATIO FOR 5 COIN WAGER AMOUNT 324 |
|---|---|---|---|
| 302 | PAIR JACKS OR BETTER | 1 | 1 |
| 304 | TWO PAIR | 2 | 2 |
| 306 | THREE OF A KIND | 3 | 3 |
| 308 | STRAIGHT | 4 | 4 |
| 310 | FLUSH | 6 | 6 |
| 312 | FULL HOUSE | 9 | 9 |
| 314 | FOUR OF A KIND | 25 | 25 |
| 316 | STRAIGHT FLUSH | 50 | 50 |
| 318 | ROYAL FLUSH | 250 | 800 |

FIG. 3

400

| | INITIAL HAND 412 | BONUS | | | | | | | | |
|---|---|---|---|---|---|---|---|---|---|---|
| | | PAIR OF JACKS OR BETTER 412 | TWO PAIR 414 | THREE OF A KIND 416 | STRAIGHT 418 | FLUSH 420 | FULL HOUSE 422 | FOUR OF A KIND 424 | STRAIGHT FLUSH 426 | ROYAL FLUSH 428 |
| 402 | J-d, J-s, 10-d, 8-d, 9-s | | | | 1 | 1 | | | | |
| 404 | FOUR CARDS TO A FLUSH | | 3 | 5 | | | 10 | 20 | | |
| 406 | GUT SHOT STRAIGHT DRAW | | | | 1 | | | | | |
| 408 | PAIR | | | | | | | 50 | 500 | 2000 |
| 409 | OPEN END STRAIGHT DRAW | | 1 | 2 | | | 5 | 15 | | |

FIG. 4

400

| INITIAL HAND | BONUS | | | | | | | | |
|---|---|---|---|---|---|---|---|---|---|
| | JACKS OR BETTER | TWO PAIR | THREE OF A KIND | STRAIGHT | FLUSH | FULL HOUSE | FOUR OF A KIND | STRAIGHT FLUSH | ROYAL FLUSH |
| 402 J-d, J-s, 10-d, 8-d, 9-s | | | | 1 | 1 | | | | |
| FOUR CARDS TO A FLUSH | | 3 | 5 | | | 10 | 20 | | |
| GUT SHOT STRAIGHT DRAW | | | | 1 | | | | | |
| TWO PAIR | | | | | | | 50 | 500 | 2000 |
| OPEN END STRAIGHT DRAW | | 1 | 2 | | | 5 | 15 | | |

200

| HAND GROUPING | PAYOUT RATIO |
|---|---|
| PAIR JACKS OR BETTER | 1 |
| TWO PAIR | 2 |
| THREE OF A KIND | 3 |
| 208 STRAIGHT | 4 |
| FLUSH | 6 |
| FULL HOUSE | 9 |
| FOUR OF A KIND | 25 |
| STRAIGHT FLUSH | 50 |
| ROYAL FLUSH | 250 |

500

| HAND GROUPING | PAYOUT RATIO |
|---|---|
| PAIR JACKS OR BETTER | 1 |
| TWO PAIR | 2 |
| THREE OF A KIND | 3 |
| STRAIGHT | 5 502 |
| FLUSH | 7 |
| FULL HOUSE | 9 |
| FOUR OF A KIND | 25 |
| STRAIGHT FLUSH | 50 |
| ROYAL FLUSH | 250 |

FIG. 5

600

| | FINAL HAND 612 | PAIR OF JACKS OR BETTER 612 | TWO PAIR 614 | THREE OF A KIND 616 | STRAIGHT 618 | FLUSH 620 | FULL HOUSE 622 | FOUR OF A KIND 624 | STRAIGHT FLUSH 626 | ROYAL FLUSH 628 |
|---|---|---|---|---|---|---|---|---|---|---|
| 602 | J-d, J-s, 10-d, 8-d, 9-s | 1 | 2 | 3 | 5 | 7 | 9 | 25 | 50 | 250 |
| 604 | FOUR CARDS TO A FLUSH | 1 | 5 | 8 | 4 | 6 | 19 | 45 | 50 | 250 |
| 606 | GUT SHOT STRAIGHT DRAW | 1 | 2 | 3 | 5 | 6 | 9 | 25 | 50 | 250 |
| 608 | PAIR | 1 | 2 | 3 | 4 | 6 | 9 | 75 | 550 | 2250 |
| 609 | OPEN END STRAIGHT DRAW | 1 | 3 | 5 | 4 | 6 | 14 | 40 | 50 | 250 |

FIG. 6

1200

| | PLAYER IDENTIFIER 1208 | NAME 1210 | ADDRESS 1212 | CASINO REWARD POINTS 1214 | BONUSES OFFERED 1216 | BONUSES ACCEPTED 1218 | BONUS ACCEPTANCE 1220 |
|---|---|---|---|---|---|---|---|
| 1202 | 12345 | ROBERT JONES | 456 MAIN ST. TOWN, STATE | 5,048 | 180 | 93 | 51.7% |
| 1204 | 98765 | SUSAN THOMPSON | P.O. BOX 51015 CITY, STATE | 9,863 | 1982 | 1639 | 82.7% |
| 1206 | 24681 | WILLIAM ANDREWS | 2468 PARK ST. CITY, STATE | 3,210 | 17 | 5 | 29.4% |

FIG. 12

1300

| | PLAYER IDENTIFIER 12345 1302 | | | | | | |
|---|---|---|---|---|---|---|---|
| | GAME IDENTIFIER 1314 | INITIAL HAND 1316 | BONUS 1318 | SELECTED DRAW STRATEGY 1320 | SELECTED OPTIMUM STRATEGY? 1322 | ACCEPTED BONUS? 1324 | PAYMENT WON 1326 |
| 1304 | 123456789012 | J-d, J-s, 10-d, 8-d, 9-s | STRAIGHT, 1 COIN BONUS | HOLD J-d, J-s | YES | NO | 2 COINS (TWO PAIR) |
| 1306 | 123456789013 | 8-h, 9-c, J-s, Q-c, 2-h | STRAIGHT, 1 COIN BONUS | HOLD 8-d, 9-c, J-s, Q-c | NO | YES | 0 (HIGH CARD ONLY) |
| 1308 | 123456789014 | 10-s, 10-d, Q-d, K-d, Q-s | ROYAL FLUSH, 1000 COIN BONUS | HOLD 10-s, 10-d, Q-d, Q-s | YES | NO | 9 COINS (FULL HOUSE) |
| 1310 | 123456789015 | A-s, 9-d, 9-s, 5-s, J-s | FOUR OF A KIND, 20 COIN BONUS | HOLD 9-d, 9-s | NO | YES | 3 COINS (THREE OF A KIND) |
| 1312 | 123456789016 | 5-c, 6-d, 7-s, 8-c, Q-h | THREE OF A KIND, 2 COIN BONUS | HOLD Q-h | NO | YES | 0 (HIGH CARD ONLY) |

FIG. 13

1500

| | INITIAL HAND | BONUS RANGE | | | | | | | | |
|---|---|---|---|---|---|---|---|---|---|---|
| | | PAIR OF JACKS OR BETTER | TWO PAIR | THREE OF A KIND | STRAIGHT | FLUSH | FULL HOUSE | FOUR OF A KIND | STRAIGHT FLUSH | ROYAL FLUSH |
| 1502 | J-d, J-s, 10-d, 8-d, 9-s | | | | 1,2 | 1,2 | | | | |
| 1504 | FOUR CARDS TO A FLUSH | | 1,5 | 2,10 | | | 4,20 | 15,30 | | |
| 1506 | GUT SHOT STRAIGHT DRAW | | | | 1 | | | | | |
| 1508 | TWO PAIR | | | | | | | 25,100 | 100,2000 | 500,5000 |
| 1510 | OPEN END STRAIGHT DRAW | | 1 | 2 | | | 3,5 | 10,25 | | |

FIG. 15

1500

1502

| INITIAL HAND | BONUS | | | | | | | | |
|---|---|---|---|---|---|---|---|---|---|
| | JACKS OR BETTER | TWO PAIR | THREE OF A KIND | STRAIGHT | FLUSH | FULL HOUSE | FOUR OF A KIND | STRAIGHT FLUSH | ROYAL FLUSH |
| J-d, J-s, 10-d, 8-d, 9-s | | | | 1,2 | 1,2 | | | | |
| FOUR CARDS TO A FLUSH | | 1,5 | 2,10 | | | 4,20 | 15,30 | | |
| GUT SHOT STRAIGHT DRAW | | | | 1 | | | | | |
| TWO PAIR | | | | | | | 25,100 | 100,200<br>0 | 500,500<br>0 |
| OPEN END STRAIGHT DRAW | | 1 | 2 | | | 3,5 | 10,25 | | |

200

208

| HAND GROUPING | PAYOUT RATIO |
|---|---|
| PAIR JACKS OR BETTER | 1 |
| TWO PAIR | 2 |
| THREE OF A KIND | 3 |
| STRAIGHT | 4 |
| FLUSH | 6 |
| FULL HOUSE | 9 |
| FOUR OF A KIND | 25 |
| STRAIGHT FLUSH | 50 |
| ROYAL FLUSH | 250 |

1600

1602

| HAND GROUPING | PAYOUT RATIO |
|---|---|
| PAIR JACKS OR BETTER | 1 |
| TWO PAIR | 2 |
| THREE OF A KIND | 3 |
| STRAIGHT | 6 |
| FLUSH | 7 |
| FULL HOUSE | 9 |
| FOUR OF A KIND | 25 |
| STRAIGHT FLUSH | 50 |
| ROYAL FLUSH | 250 |

FIG. 16

METHOD AND APPARATUS FOR VIDEO POKER USING ALTERNATE DRAW STRATEGIES

The present application is a continuation of U.S. patent application Ser. No. 10/202,192, filed Jul. 23, 2002, entitled METHOD AND APPARATUS FOR VIDEO POKER, and issued as U.S. Pat. No. 7,201,655 on Apr. 10, 2007;

which is a continuation-in-part of U.S. patent application Ser. No. 09/109,839, filed Jul. 2, 1998 and issued as U.S. Pat. No. 6,422,940 on Jul. 23, 2002.

The content of each of these applications is incorporated herein by reference.

FIELD OF THE INVENTION

The present invention relates to games of chance.

BACKGROUND OF THE INVENTION

Gaming devices are a significant source of revenue for casinos, and casinos continue to search for new ways to attract players to such devices. Most gaming devices, including video poker devices and other slot machines, allow players to wager on various game outcomes. A typical video poker device receives a wager amount from a player and generates an initial hand of five cards that are drawn from a "deck" of fifty-two different cards. Each card has a suit (clubs, spades, hearts or diamonds) and a rank (2-10, Jack, Queen, King, or Ace).

The player then selects which cards, if any, he would like to "hold". The player may hold anywhere from no cards to all five cards. Cards that are not held are discarded (removed from the initial hand) and replaced with an equal number of new cards that are drawn from the deck of forty-seven remaining cards (52–5=47).

The cards that are selected to be held define a "draw strategy". For example, if the first and third cards are held, then the corresponding draw strategy is to discard the second, fourth and fifth cards and draw three new cards to replace them. After new cards are drawn, a second hand results. The second hand is different from the initial hand unless all five cards are held (no cards are drawn). Since each of the five cards in the hand may either be held or not held (i.e. two choices per card), each initial hand defines thirty-two draw strategies (2*2*2*2*2=32). Similarly, each draw strategy defines a set of possible second hands. For example, if the draw strategy is to hold the first four cards (draw one card to replace the fifth), then that draw strategy defines forty-seven possible second hands (the one card drawn may be one of forty-seven cards in the deck). Each of these forty-seven possible second hands includes the first four cards of the initial hand, and also includes a fifth card that is selected from the deck. In another example, if the draw strategy is to hold all cards (draw no cards), then that draw strategy defines one possible second hand, which is the same as the initial hand.

If the second hand is a type of "winning hand", the player is awarded a payment amount that is based on the winning hand and the wager amount. A "hand grouping" defines one or more winning hands that share a characteristic. For example, the hand grouping "four of a kind", defines several winning hands, each of which has four cards of the same rank. The following three winning hands are included in the set defined by the hand grouping "four of a kind":

J-hearts, J-diamonds, J-clubs, J-spades, 7-clubs 7-clubs, 8-hearts, 8-diamonds, 8-clubs, 8-spades J-hearts, J-diamonds, 3-diamonds, J-clubs, J-spades Similarly, the hand grouping "royal flush" defines four winning hands:

10-hearts, Jack-hearts, Queen-hearts, King-hearts, Ace-hearts 10-diamonds, Jack-diamonds, Queen-diamonds, King-diamonds, Ace-diamonds 10-spades, Jack-spades, Queen-spades, King-spades, Ace-spades 10-clubs, Jack-clubs, Queen-clubs, King-clubs, Ace-clubs.

In video poker, the arrangement of the cards within a hand is ignored. Some hand groupings are mutually exclusive. Thus, a hand included in one such hand grouping cannot be included in another such hand grouping. For example, a hand:

10-diamonds, Jack-diamonds, King-diamonds, Queen-diamonds, Ace-diamonds is included in the set defined by "royal flush", but not in the set defined by "flush".

Typically, each hand grouping has a corresponding payout ratio that defines an amount of payment won for each unit of a wager amount. If the second hand is a winning hand, then the hand grouping corresponding to that hand indicates a payout ratio, and the payout ratio multiplied by the wager amount is the payment awarded. For example, if the second hand is:

Ace-hearts, 3-hearts, 7-hearts, 5-hearts, 10-hearts then the corresponding hand grouping is a "flush" (all cards have the same suit). If "flush" has a corresponding payout ratio of six, then the payment amount is six times the wager amount.

Each draw strategy has an expected value which generally indicates the average payout that will be received if a draw strategy is chosen for a first hand. The expected value of a draw strategy may be calculated as the sum of the products of the probability of receiving each possible second hand times the payment amount won (if any) for receiving each possible second hand. The optimum draw strategy is the draw strategy having the highest expected value.

For example, a player dealt a first hand of

King-diamonds, King-spades, 8-hearts, 8-clubs, 2-clubs may select the draw strategy of holding the two Kings and the two 8's, and discarding the 2-clubs. Consequently, only two hand groupings are possible: a full house (three cards with one rank and two cards with another rank) or two pair. The expected value of this draw strategy is the sum of the products of the probability of each hand grouping occurring multiplied by the payment received according to each hand grouping.

For the selected draw strategy, the second hand will be a "Full house" if the drawn card is a King or an 8, and two kings and two 8's remain in the deck of forty seven cards. Accordingly, the probability of a "Full House" is approximately 8.5% (4/47=0.085). Similarly, if any of the other cards are drawn from the deck, the second hand will be "Two Pair". Accordingly, the probability of "Two Pair" is approximately 91.5% (43/47=0.915).

If the payout ratio for a "Full House" is "9" and the payout ratio for two pair is "2", the expected value of the selected draw strategy may be calculated as follows:

$$[0.085*9]+[0.915*2]=[0.766]+[1.83]=2.596.$$

Players who often (or always) choose "optimum" draw strategies (e.g., strategies having the highest expected value) for each initial hand generally tend to win somewhat higher average payment amounts from video poker devices than players who more often follow suboptimum strategies. Casinos generally would like to reduce the payout ratios so that the play of more skilled players (e.g., professional players, players generally employing optimum draw strategies) does not result in little profit for the casino (or even a loss). On the other hand, because players who typically employ suboptimum strategies receive lower payments on average than more skilled players, reducing the payout ratios may discourage less skilled players from playing.

U.S. Pat. No. 5,511,781 to Wood et al. describes a game system that calculates the expected value of elements (e.g., cards) a player currently possesses. The expected value is used to set the size of a guaranteed award provided if the player stops playing.

U.S. Pat. No. 5,401,023 to Wood describes a video poker game that calculates the optimum strategy from the expected value of each possible strategy. The video poker game computes the expected value of each discard strategy and then determines which discard strategy is the optimum strategy. If the player selects a strategy other than the optimum strategy, the award values for the hand groupings of cards are adjusted so the expected value of the selected strategy is substantially equal to that of the optimum strategy. Thus, players who are not able to recognize what constitutes the optimum strategy for any given hand will win substantially the same amount of money over a long term as more skilled players who can recognize and play the optimum strategy for any given hand. The game displays the adjusted awards to the player after each strategy is selected. This permits the player to evaluate the possible strategies.

BRIEF DESCRIPTION OF THE DRAWINGS

FIG. 2 is a table representing a base payout table of the gaming device of FIG. 1.

FIG. 3 is a table representing another embodiment of a base payout table of the gaming device of FIG. 1.

FIG. 4 is a table representing bonus tables of the gaming device of FIG. 1.

FIG. 5 is another illustration of the tables of FIGS. 2 and 4.

FIG. 6 is a table representing an embodiment of a payout database of FIG. 1.

FIG. 12 is a table representing a player database of the network server of FIG. 11.

FIG. 13 is a table representing a record of another embodiment of the player database of the network server of FIG. 11.

FIG. 15 is a table representing another embodiment of bonus tables of the gaming device of FIG. 1.

FIG. 16 is another illustration of the tables of FIGS. 2 and 15.

DETAILED DESCRIPTION OF THE PREFERRED EMBODIMENTS

Figure 1:
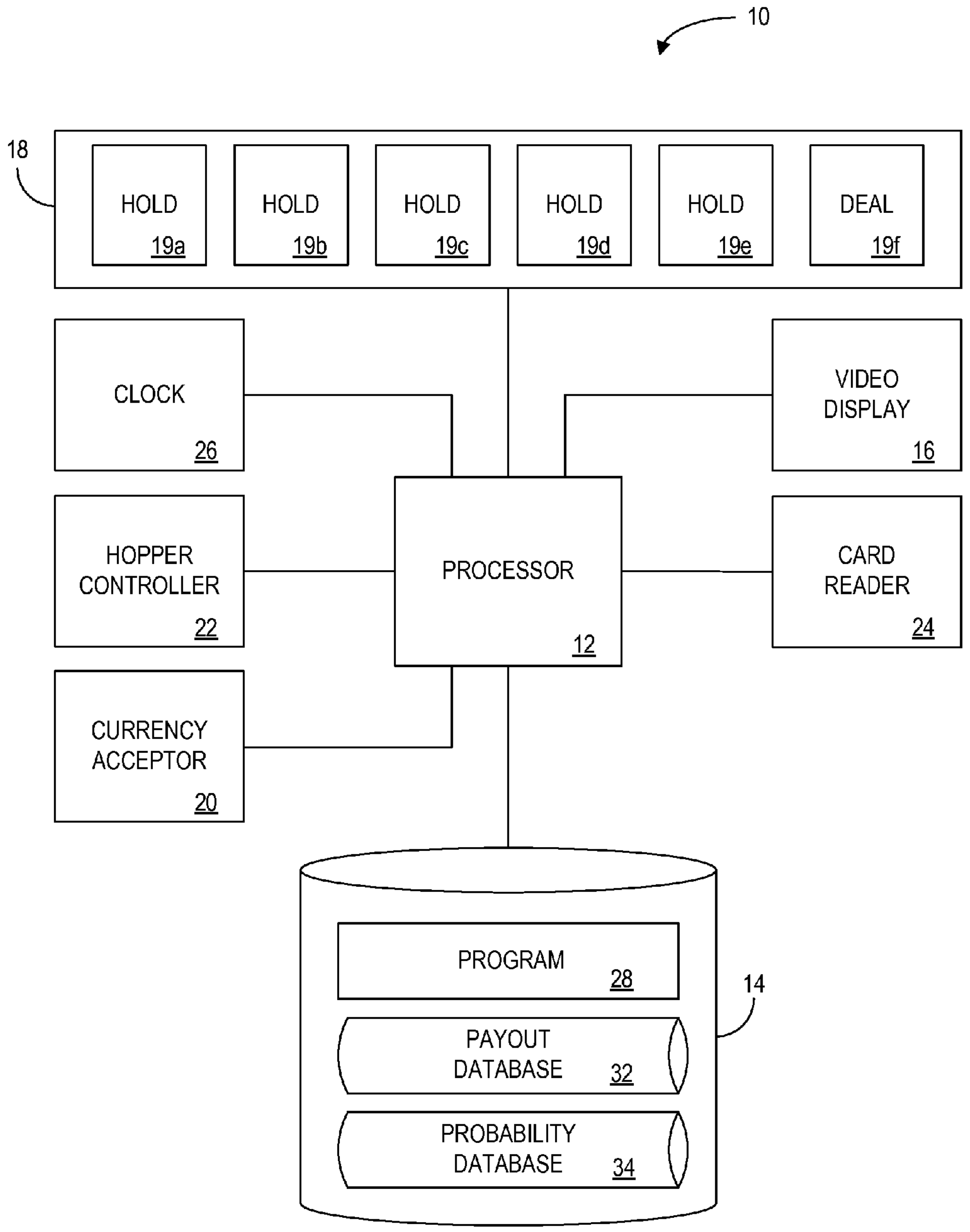
FIG. 1 is a schematic illustration of a gaming device provided in accordance with the present invention.

According to one or more embodiments of the present invention, a method is provided that comprises determining at least a first strategy and a second strategy for play of a game, selecting at least one final outcome that cannot result from the first strategy, and increasing a payout ratio associated with the selected at least one final outcome.

In accordance with one or more embodiments of the present invention, a method is provided comprising determining a first hand of cards, the first hand defining a plurality of draw strategies, the plurality including a first draw strategy; selecting a hand grouping that cannot result from the first draw strategy; and increasing a payout ratio associated with the selected hand grouping.

According to one or more embodiments of the present invention, a hand of cards is determined. The hand defines a plurality of draw strategies, including a first draw strategy. A hand grouping is then identified. The payout ratio of the identified hand grouping is increased by adding a bonus amount thereto. The expected values of the first draw strategy and at least one second draw strategy are then determined based on the increased payout ratio. In some embodiments, at least one second draw strategy is a suboptimum draw strategy. The identified hand grouping may be selected if the expected value of the at least one second draw strategy, as based on the increased payout ratio, is not greater than the expected value of the first draw strategy, as based on the increased payout ratio. In some embodiments, the hand grouping may be selected if the expected value of the at least one second draw strategy, as based on the increased payout ratio, is not less than the expected value of the at least one second draw strategy, as based on the original payout ratio. In some embodiments, the hand grouping may be selected if the expected value of the first draw strategy, as based on the increased payout ratio, is substantially equal to the expected value of the first draw strategy, as based on the original payout ratio. If the identified hand grouping is selected based on the one or more criteria, the payout ratio of the selected hand grouping is increased by adding the bonus amount thereto.

In accordance with one or more embodiments of the present invention, a first hand of cards is determined. The first hand defines a plurality of draw strategies (each card held or not held), and at least one draw strategy has a maximum expected value of any respective expected value associated with each of the plurality of draw strategies.

A hand grouping is then selected that cannot result from any draw strategy having an expected value that is not greater than a predetermined amount. For example, a hand grouping may be selected that cannot result from any draw strategy having an expected value that is within 10% of a maximum expected value. In another example, a hand grouping may be selected that cannot result from any draw strategy having an expected value that is within $2 of a maximum expected value. In another example, the predetermined amount may be substantially equal to a maximum expected value, and/or may be substantially equal to an expected value of a preferred strategy. The payout ratio of the selected hand grouping is increased by adding a bonus amount thereto. An incentive may thus be provided for a player to select a draw strategy having an expected value that is not greater than a predetermined amount.

The increasing of a payout ratio may affect one or more respective expected values of the plurality of draw strategies. Accordingly, in some embodiments, the expected values of one or more draw strategies may be determined based on the increased payout ratio. In one or more embodiments, the hand grouping is selected and the payout ratio for that hand grouping is increased, if the selected hand grouping cannot result from any draw strategy having an expected value that is greater than a predetermined expected value, in which one or more of the respective expected values and/or the predetermined expected value are determined based on the increased payout ratio.

In accordance with one or more embodiments of the present invention, an initial hand of five cards is generated. The first hand defines thirty-two draw strategies (each card held or not held), and at least one draw strategy is an optimum draw strategy having the maximum expected value of all draw strategies. A hand grouping is then selected that cannot result from the optimum draw strategy. For example, for a hand of "10-clubs, 10-spades, 5-diamonds, 2-diamonds, 4-diamonds", the hand grouping "Flush" cannot result from a draw strategy that requires holding two or more cards with different suits.

The payout ratio of the selected hand grouping is increased by adding a bonus amount thereto. An incentive is thus provided for a player to select a suboptimum draw strategy, yet the expected value of the optimum strategy is unaffected by the increased payout.

Thus, according to some embodiments of the present invention, even lesser-skilled players can receive benefits although they do not have the skill to select optimum draw strategies regularly. In addition, the increased payout ratios can vary the game such that higher-skilled (e.g., professional) video poker players will find the game to be more challenging and interesting.

Some embodiments of the present invention may be performed at and/or by a gaming device.

As will be understood by those skilled in the art, the drawings and accompanying descriptions presented herein are exemplary arrangements for stored representations of information. A number of other arrangements may be employed besides the tables shown. Similarly, the illustrated entries represent exemplary information, but those skilled in the art will understand that the number and content of the entries can be different from those illustrated herein.

Referring to FIG. 1, a gaming device 10 comprises a processor 12, such as one or more conventional microprocessors, which is in communication with a data storage device 14, such as an appropriate combination of magnetic, optical and/or semiconductor memory. The processor 12 and the storage device 14 may each be (i) located entirely within a single computer or other computing device, (ii) in communication with each other by a remote communication link, such as a serial port cable, telephone line or radio frequency transceiver, or (iii) a combination thereof. For example, the gaming device 10 may comprise one or more computers that are in communication with a remote server computer for maintaining databases.

The processor 12 is further in communication with a video display 16 and a player input device 18. The video display 16 is a graphical display device, such as a video monitor of a type used in conventional electronic gaming devices, for displaying images generated by the processor 12 during a game. Such images are described below, and may include representations of hands, payout ratios and/or payment amounts. The player input device 18 may include types of input devices that are well known in the art, such as a touch screen for generating a signal indicative of a location on the touch screen that is touched or pressed by a player, and/or buttons which indicate player commands and selections when actuated. Other types of input devices will be understood by those skilled in the art. The player input device 18 includes controls 19*a*, 19*b*, 19*c*, 19*d*, 19*e* and 19*f*, which may be buttons or areas of a touch screen. The controls 19*a*, 19*b*, 19*c*, 19*d*, 19*e* and 19*f* allow a player to make various selections and to transmit commands during game play. For example, the controls 19*a*, 19*b*, 19*c*, 19*d* and 19*e* are each used to indicate a card of an initial hand to hold. Thus, the controls 19*a*, 19*b*, 19*c*, 19*d* and 19*e* are used to indicate a draw strategy. Similarly, the control 19*f* is used to indicate when to initiate a game and/or when a draw strategy has been finalized.

Those skilled in the art will understand that the player input device 18 may include further types of controls. For example, the player input device 18 may include controls that allow selection of predetermined draw strategies, or controls that allow selection of an indicated draw strategy. Furthermore, the player input device 18 may include controls that allow the player to select information to display, such as payout ratios for hand groupings.

The processor 12 is further in communication with a currency acceptor 20 for generating a signal indicative of the number of coins or bills inserted and their type. The currency acceptor 20 thereby allows the processor 12 to determine an amount of funds that are deposited by a player and retained in a currency reservoir (not shown). A hopper controller 22 for directing the dispensing of coins from the currency reservoir (not shown) is in communication with the processor 12. When the player requests to "cash out" (e.g., to receive all or a portion of funds he is due), the processor 12 determines if the player is due any funds. If so, the processor 12 directs the hopper controller 22 to release an appropriate number and type of coins in a known manner.

The processor 12 is further in communication with a card reader 24 for reading information stored on a player tracking card (not shown). Such a player tracking card may be magnetically encoded with data representing an amount of funds, and/or with data representing a player identifier, such as a player account number or a player name. As described below, the player identifier can be used in accessing other player-related information stored on a network server or other remote device, such as an account of player funds. Thus, the card reader 24 also allows the processor 12 to receive and transmit player-related information, and a player may use a player tracking card instead of inserting currency into and receiving currency from the gaming device 10. The card reader 24 may also include a display for displaying the value of funds stored in association with a player tracking card, thereby informing the player of an amount of funds available.

A clock 26 in communication with the processor 12 generates signals that indicate time. Thus, the processor 12 may ascertain the time of day or the time that has elapsed between two events.

The storage device 14 stores (i) a program 28 for controlling the processor 12; (ii) a payout database 32; and (iii) a probability database 34 storing the probabilities that various hands will occur. The processor 12 performs instructions of the program 28, thereby operating in accordance with the present invention, and particularly in accordance with the methods described in detail herein. For example, the program 28 may store data indicative of game rules and game elements. The program 28 furthermore includes program elements that may be necessary, such as an operating system and "device drivers" for allowing the processor to interface with computer peripheral devices, such as the hopper controller 22 and the card reader 24. Appropriate device drivers and other necessary program elements are known to those skilled in the art, and need not be described in detail herein.

In some embodiments, the gaming device 10 is an electronic or electromechanical device similar to those known in the art and used in casinos. Accordingly, the gaming device 10 would include typical components such as the currency acceptor 20, the hopper controller 22 and/or the card reader 24. In other embodiments, the gaming device 10 may be implemented as software and/or hardware that directs one or more devices, such as conventional personal computers, portable computers, personal digital assistants, cellular telephones, video game consoles, or handheld devices. Such computing devices may be based, for example on one or more INTEL PENTIUM® microprocessors. Furthermore, some embodiments of the gaming device 10 may be operative to implement gaming over networks, such as the Internet.

Referring to FIG. 2, a base payout table 200 defines a base payout ratio for each of a plurality of hand groupings. A base payout ratio is a payout ratio that is added to a bonus (if any) to yield a payout ratio that applies to a final hand. The base payout table 200 may be stored in the payout database 32 (FIG. 1). The base payout table 200 includes entries 202, 204, 206, 208, 210, 212, 214, 216 and 218. Each entry defines (i) a hand grouping identifier 220 that uniquely identifies the hand grouping, and (ii) a payout ratio 222 corresponding to the hand grouping. Those skilled in the art will understand that although nine entries are depicted in FIG. 2, the present invention contemplates that any number of entries may be used. The illustrated payout ratios of the base payout table 200 are typical of the rules for a "full pay Jacks or better" video poker game. More information on video poker payout ratios may be found in "Professional Video Poker", by Stanford Wong, published by Pi Yee Press.

FIG. 3 illustrates another embodiment in which a base payout table 300 defines a plurality of base payout ratios for each of a plurality of hand groupings. In the illustrated embodiment, each hand grouping has a plurality of corresponding base payout ratios, and each base payout ratio corresponds to a different wager amount. The base payout table 300 may be stored in the payout database 32 (FIG. 1). The base payout table 300 includes entries 302, 304, 306, 308, 310, 312, 314, 316 and 318. Each entry defines (i) a hand grouping identifier 320 that uniquely identifies the hand grouping, (ii) a payout ratio 322 corresponding to the hand grouping if between one and four coins (currency units) are wagered, and (iii) a payout ratio 324 corresponding to the hand grouping if five coins (currency units) are wagered. For example, the entry 318 indicates that the payout ratio for a "royal flush" is "800" if five coins are wagered, and "250" if four or fewer coins are wagered. Such an increased payout ratio would tend to encourage players to wager the maximum number of coins, thereby resulting in a greater profit to the casino on average. Those skilled in the art will understand that although nine entries are depicted in FIG. 3, the present invention contemplates that any number of entries may be used. For example, a hand grouping of "Pair of Tens or lower or high card" could be included with a corresponding payout ratio of zero.

Referring to FIG. 4, a table 400 represents information that may be stored in the payout database 32 in some embodiments of the present invention. In the embodiment illustrated in FIG. 4, the table 400 defines a bonus table for each of a plurality of initial hands. The table 400 includes entries 402, 404, 406, 408 and 409, each representing a bonus table for an initial hand. Each bonus table in turn defines bonuses that are added to base payout ratios of hand groupings. Those skilled in the art will understand that each bonus table of the payout database 32 may define a plurality of corresponding bonuses for each hand grouping, each added to a corresponding base payout ratio for the hand grouping as described above with reference to FIG. 3.

Each of the entries 402, 404, 406, 408 and 409 includes (i) an initial hand descriptor 410 describing the initial hand, (ii) a bonus 412 for the hand grouping "Pair of Jacks or better", (iii) a bonus 414 for the hand grouping "Two pair", (iv) a bonus 416 for the hand grouping "Three of a kind", (v) a bonus 418 for the hand grouping "Straight", (vi) a bonus 420 for the hand grouping "Flush", (vii) a bonus 422 for the hand grouping "Full house", (viii) a bonus 424 for the hand grouping "Four of a kind", (ix) a bonus 426 for the hand grouping "Straight flush", and (x) a bonus 428 for the hand grouping "Royal flush". For example, the entry 404 indicates that when an initial hand is "four cards to a flush" (i.e. a hand in which exactly four cards have the same suit), and the final hand is "Three of a Kind" (i.e. a hand in which exactly three cards have the same rank), the bonus is "5". Thus, if the initial hand is "four cards to a flush", then two is added to the base payout ratio corresponding to the hand grouping "Three of a Kind". Only non-zero bonuses are explicitly indicated in FIG. 4. For example, the bonus for a "Royal flush" is zero if the initial hand is a "Pair".

Those skilled in the art will understand that other hand groupings are possible. For example, instead of the hand grouping "Four of a kind", there could be thirteen hand groupings that each define a hand having four cards of a rank (i.e. one hand grouping for each of the thirteen ranks). Such hand groupings would facilitate the selection of bonuses.

Referring to FIG. 5, the base payout table 200 (FIG. 2) and the table 400 (FIG. 4) are depicted again to illustrate their use in generating a payout table used to determine a payment amount for a final hand. A payout table 500 defines a payout ratio for each of a plurality of hand groupings. The entry 208 indicates that a base payout ratio for a "Straight" is "4", and the entry 402 indicates that a bonus of "1" added to the base payout ratio of a "Straight" if the initial hand is a "Pair". Accordingly, an entry 502 indicates that a payout ratio of "5" (4+1=5) applies if the initial hand is a "Pair" and the final hand is a "Straight". Since a "Straight" cannot result from the draw strategy of holding the pair, adding a bonus to the payout ratio of the "Straight" may encourage the player to discard the pair or "break up" the pair (discard one of the pair).

A base payout table need not be stored in every embodiment of the present invention. For example, in an embodiment where the payout database 32 defines a payout table for each of a plurality of initial hands, a base payout table is not required.

Referring to FIG. 6, a table 600 represents an embodiment of the payout database 32. The table 600 defines a payout table for each of a plurality of initial hands. Each payout table in turn defines a payout ratio for each of a plurality of hand groupings. Those skilled in the art will understand that each payout table may define a plurality of corresponding base payout ratios for each hand grouping, as described above with reference to FIG. 3. The table 600 includes entries 602, 604, 606, 608 and 609, each defining a payout table for an initial hand. Each of the payout tables represented by the entries 602, 604, 606, 608 and 609 are typically similar to a base payout table, but differ for those payout ratios that are increased by a bonus.

Each of the entries 602, 604, 606, 608 and 609 includes (i) an initial hand descriptor 610 describing the initial hand, (ii) a payout ratio 612 for the hand grouping "Jacks or better", (iii) a payout ratio 614 for the hand grouping "Two pair", (iv) a payout ratio 616 for the hand grouping "Three of a kind", (v) a payout ratio 618 for the hand grouping "Straight", (vi) a payout ratio 620 for the hand grouping "Flush", (vii) a payout ratio 622 for the hand grouping "Full house", (viii) a payout ratio 624 for the hand grouping "Four of a kind", (ix) a payout ratio 626 for the hand grouping "Straight flush", and (x) a payout ratio 628 for the hand grouping "Royal flush". For example, the entry 604 indicates that when an initial hand is "four cards to a flush", and the final hand is "Three of a Kind", the payout ratio is "5". Thus, if the wager amount is one unit, the corresponding payment amount is five units (5×1=5).

Referring again to FIG. 2, the entry 206 of the base payout table 200 indicates that if the final hand is "Three of a Kind", the base payout ratio is "3", rather than "8" as indicated by the entry 604 of FIG. 6. Thus, when the initial hand is "four cards to a flush", the payout ratio exceeds the base payout ratio by five (8−3=5). Accordingly, it may be stated that there is a "bonus" of "5" units for the final hand "Three of a Kind" if the initial hand is "four cards to a flush".

Figure 7:
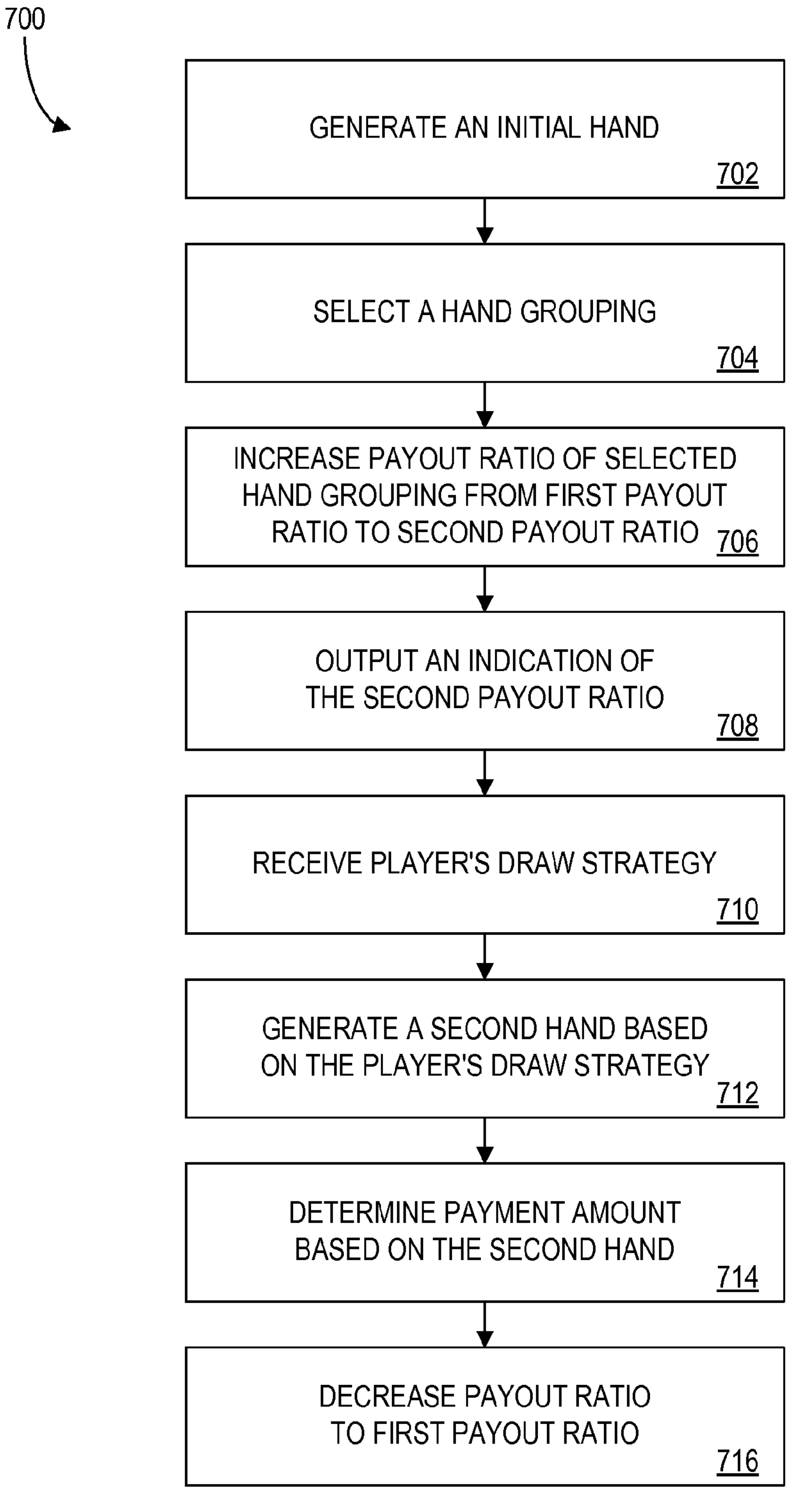
FIG. 7 is a flowchart illustrating a method for directing a gaming device in accordance with the present invention.

Referring to FIG. 7, a process 700 that is performed by the gaming device begins with the start of a game. A game is typically started when the player indicates a wager amount and subsequently actuates the control **19*f* (FIG. 1). In response, the gaming device generates an initial hand (step 702). For example, the processor 12 (FIG. 1**) may randomly sort the fifty-two cards of the deck, or generate five random numbers to represent five cards dealt from a deck of fifty-two cards. The initial hand defines a plurality of draw strategies, at least one of which is an optimum draw strategy. In particular, in a video poker game each of the five cards in the initial hand may be held or not held. Thus, the initial hand defines thirty-two draw strategies, which are represented in Table 1 below.

TABLE 1

Draw Strategies for Initial Hand

| Hold 1st Card? | Hold 2nd Card? | Hold 3rd Card? | Hold 4th Card? | Hold 5th Card? |
|---|---|---|---|---|
| No | No | No | No | No |
| No | No | No | No | Yes |
| No | No | No | Yes | No |
| No | No | No | Yes | Yes |
| No | No | Yes | No | No |
| No | No | Yes | No | Yes |
| No | No | Yes | Yes | No |
| No | No | Yes | Yes | Yes |
| No | Yes | No | No | No |
| No | Yes | No | No | Yes |
| No | Yes | No | Yes | No |
| No | Yes | No | Yes | Yes |
| No | Yes | Yes | No | No |
| No | Yes | Yes | No | Yes |
| No | Yes | Yes | Yes | No |
| No | Yes | Yes | Yes | Yes |
| Yes | No | No | No | No |
| Yes | No | No | No | Yes |
| Yes | No | No | Yes | No |
| Yes | No | No | Yes | Yes |
| Yes | No | Yes | No | No |
| Yes | No | Yes | No | Yes |
| Yes | No | Yes | Yes | No |
| Yes | No | Yes | Yes | Yes |
| Yes | Yes | No | No | No |
| Yes | Yes | No | No | Yes |
| Yes | Yes | No | Yes | No |
| Yes | Yes | No | Yes | Yes |
| Yes | Yes | Yes | No | No |

TABLE 1-continued

Draw Strategies for Initial Hand

| Hold 1st Card? | Hold 2nd Card? | Hold 3rd Card? | Hold 4th Card? | Hold 5th Card? |
|---|---|---|---|---|
| Yes | Yes | Yes | No | Yes |
| Yes | Yes | Yes | Yes | No |
| Yes | Yes | Yes | Yes | Yes |

The gaming device selects at least one hand grouping that cannot result from the optimum draw strategy (step 704). In one embodiment, the table 400 (FIG. 4) defines the selected hand groupings; specifically, all non-zero bonuses for the indicated initial hand correspond to the selected hand groupings. For example, if an initial hand is:

Queen-diamonds, Queen-spades, 3-hearts, 4-spades, 5-spades then the entry 402 of the table 400 includes two non-zero bonuses (i.e. for "Straight" 418 and "Flush" 420). Thus the corresponding hand groupings, "Straight" and "Flush", are the selected hand groupings that cannot result from the optimum draw strategy. Another method for selecting a hand grouping that cannot result from the optimum draw strategy is described in further detail below.

The payout ratio of the selected hand grouping is increased from a first payout ratio to a second payout ratio (step 706). In one embodiment, the base table 200 (FIGS. 2 and 5) defines the first payout ratio for each hand grouping, and the table 400 defines amounts to add to the first payout ratio to yield the second payout ratio. For example, for the hand grouping "Straight", the entry 208 indicates a base payout ratio (first payout ratio) of "4". If the initial hand is a hand having only one pair, then the entry 402 of the table 400 indicates that a bonus of "1" is added to the base payout ratio. The sum is the second payout ratio "5" (4+1=5). Another method for increasing the payout ratio of the selected hand grouping(s) is described in further detail below.

The increased payout ratio provides the player with an incentive to select a draw strategy that may result in the selected hand grouping. The gaming device outputs an indication of the second payout ratio (step 708). The gaming device may display on the video display 16 (FIG. 1) the amount of the second payout ratio, or the amount by which the second payout ratio exceeds the first payout ratio. For example, the message "This hand only, Straight pays an extra coin for each coin wagered" may be displayed on the video display 16. The gaming device may also output an audio indication, such as a recorded message or a message generated by voice-synthesis. Thus, the player is made aware of the increased payout ratio (i.e. the player is offered the bonus) and can select his draw strategy accordingly.

The gaming device may also require that a player pay for the increased payout ratio. In such an embodiment, the gaming device may output an indication of a required amount of additional funds, such as "Insert two additional coins to be eligible for a five coin bonus for the Straight". Once the gaming device receives a signal indicating that the required amount of additional funds has been inserted, the payout ratio of the selected hand grouping is increased. Such a signal may be generated by the currency acceptor 20 of FIG. 1.

The player selects a draw strategy, for example, by operating the player input device 18 (FIG. 1). Signals representing the player's draw strategy are received by the processor 12 (step 710), and are used to generate a second (final) hand that is based on the player's draw strategy (step 712). The payment amount to be provided to the player is determined based on the second hand (step 714). For example, if the second hand is a "Flush", the payout ratio corresponding to "Flush" is multiplied by the wager amount to determine the payment amount. In particular, if the final hand corresponds to the selected hand grouping, then the second payout ratio is multiplied by the wager amount to determine the payment amount. The payout ratio is then adjusted back to the first payout ratio (step 716).

The step 704 of selecting at least one hand grouping that cannot result from the optimum draw strategy may comprise determining from the table 400 all non-zero bonuses for the indicated initial hand. However, in another embodiment a hand grouping may be selected without reference to such a stored bonus table. On the contrary, the hand grouping may be selected by performing calculations such as those described below.

Figure 8:
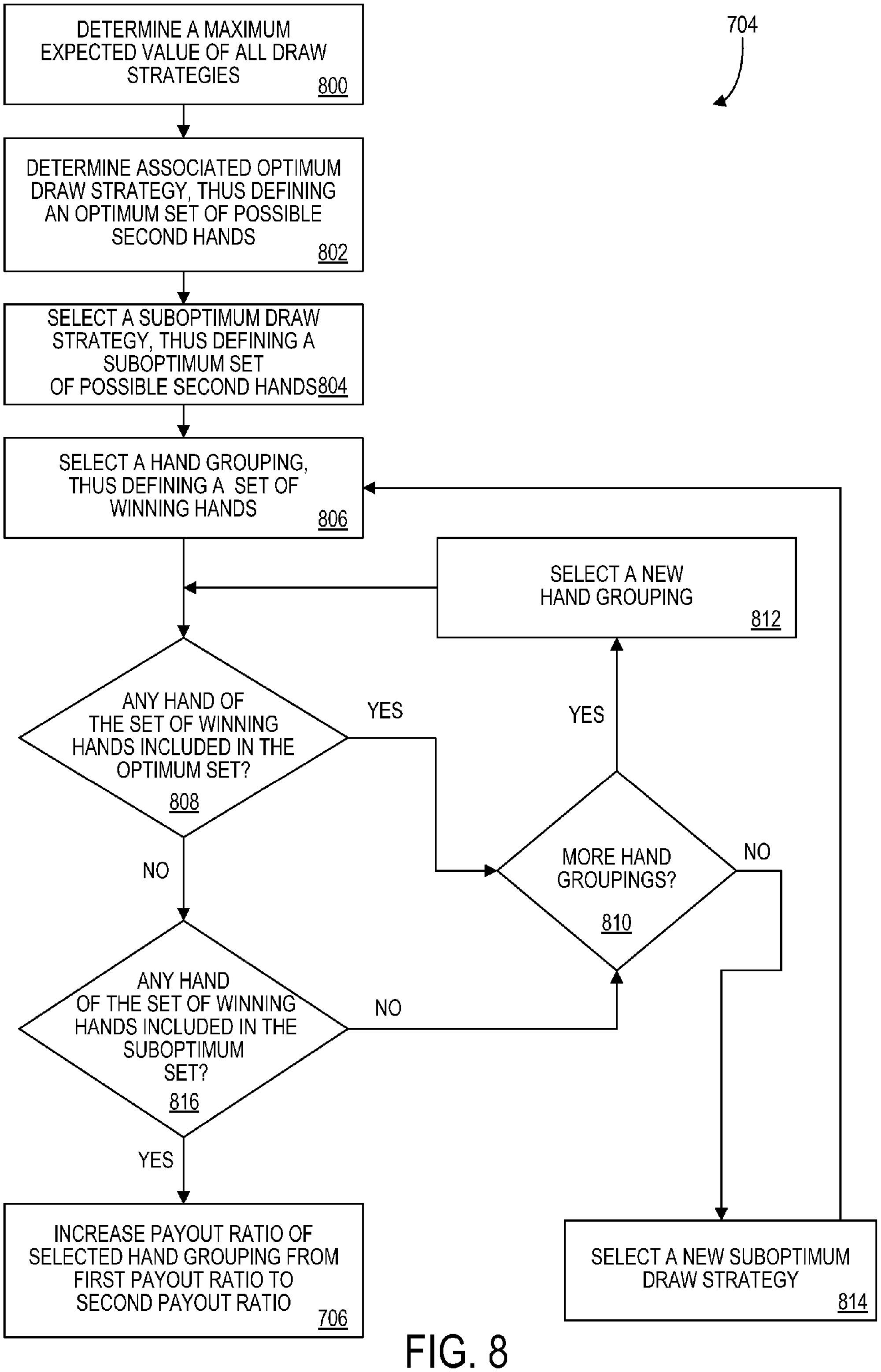
FIG. 8 is a flowchart illustrating a method for selecting a hand grouping that cannot result from the optimum draw strategy.

FIG. 8 illustrates in further detail one embodiment of the step 704 of selecting a hand grouping that cannot result from the optimum draw strategy. In particular, the gaming device selects a hand grouping that cannot result from the optimum draw strategy, but that can result from a selected suboptimum strategy. The gaming device determines the maximum expected value of all thirty-two draw strategies (step 800). As is known by those skilled in the art, the expected value of a draw strategy may be calculated as the sum of the products of the probability of receiving a possible second hand times the payment amount won (if any) for receiving that possible second hand. Calculating the expected value of a draw strategy is explained in "Video Poker", by Lenny Fromc published by Compu-Flyers. Alternatively, the maximum expected value may be determined from a table that defines the maximum expected value for each of a plurality of initial hands.

The draw strategy (or draw strategies) that corresponds to the maximum expected value is determined (step 802), and is referred to as the optimum draw strategy. The optimum draw strategy defines a set of possible second hands referred to as the "optimum set". Thus, if the player selects the optimum draw strategy, the final hand will be one hand from the optimum set. For example, in an initial hand of Jack-hearts, Jack-diamonds, Jack-spades, 4-spades, 9-clubs if the draw strategy of holding the three Jacks results in the highest expected value (as would be the case in most video poker games), then this draw strategy is the optimum draw strategy. The optimum set includes hands that are also included in the hand groupings "Three of a Kind", "Full House" and "Four of a Kind".

A suboptimum draw strategy is selected (step 804). The suboptimum draw strategy is a draw strategy having an expected value less than the maximum expected value determined in step 800. In one embodiment, the gaming device selects a draw strategy that has an expected value that is less than or equal to a predetermined percentage of the maximum expected value. For example, the gaming device may select a draw strategy that has an expected value that is less than or equal to 50% of the maximum expected value. More particularly, the gaming device may identify the draw strategies that have an expected value less than or equal to 50% of the maximum expected value. Then, the identified draw strategy having the greatest expected value is selected.

The suboptimum draw strategy defines a set of possible second hands referred to as the "suboptimum set". Thus, if the player selects the suboptimum draw strategy, the final hand will be one hand from the suboptimum set. The optimum set and the suboptimum set are mutually exclusive; no hand is included in both the optimum set and the suboptimum set.

In one embodiment, the gaming device outputs an indication of the suboptimum draw strategy and further allows the player to automatically select the suboptimum draw strategy by, for example, actuating a button.

The gaming device selects a hand grouping (step 806), and the selected hand grouping defines a set of winning hands. If any hand of the set of winning hands is included in the optimum set (step 808), then the selected hand grouping may result from the optimum draw strategy. Such a determination is contrary to a function of the step 704, and so it is determined whether there are any more hand groupings (step 810). If there are more hand groupings that have not been compared with the optimum set, then a new hand grouping is selected (step 812), thus defining another set of winning hands. However, if there are no more hand groupings that have not been compared with the optimum set, then a new suboptimum draw strategy is selected (step 814).

If at step 808 it is determined that there is no hand of the set of winning hands included in the optimum set, then the gaming device determines whether any hand of the set of winning hands is included in the suboptimum set (step 816). If not, then the selected suboptimum draw strategy cannot result in any hand of the selected hand grouping. Consequently, the gaming device selects a new hand grouping or a new suboptimum draw strategy, as described above with reference to steps 810, 812 and 814.

If at step 816 it is determined that a hand of the set of winning hands is included in the suboptimum set, then the selected hand grouping cannot result from the optimum draw strategy, and can result from the selected suboptimum strategy. The gaming device then increases the payout ratio of the selected hand grouping from a first payout ratio to a second payout ratio (step 706).

Figure 9:
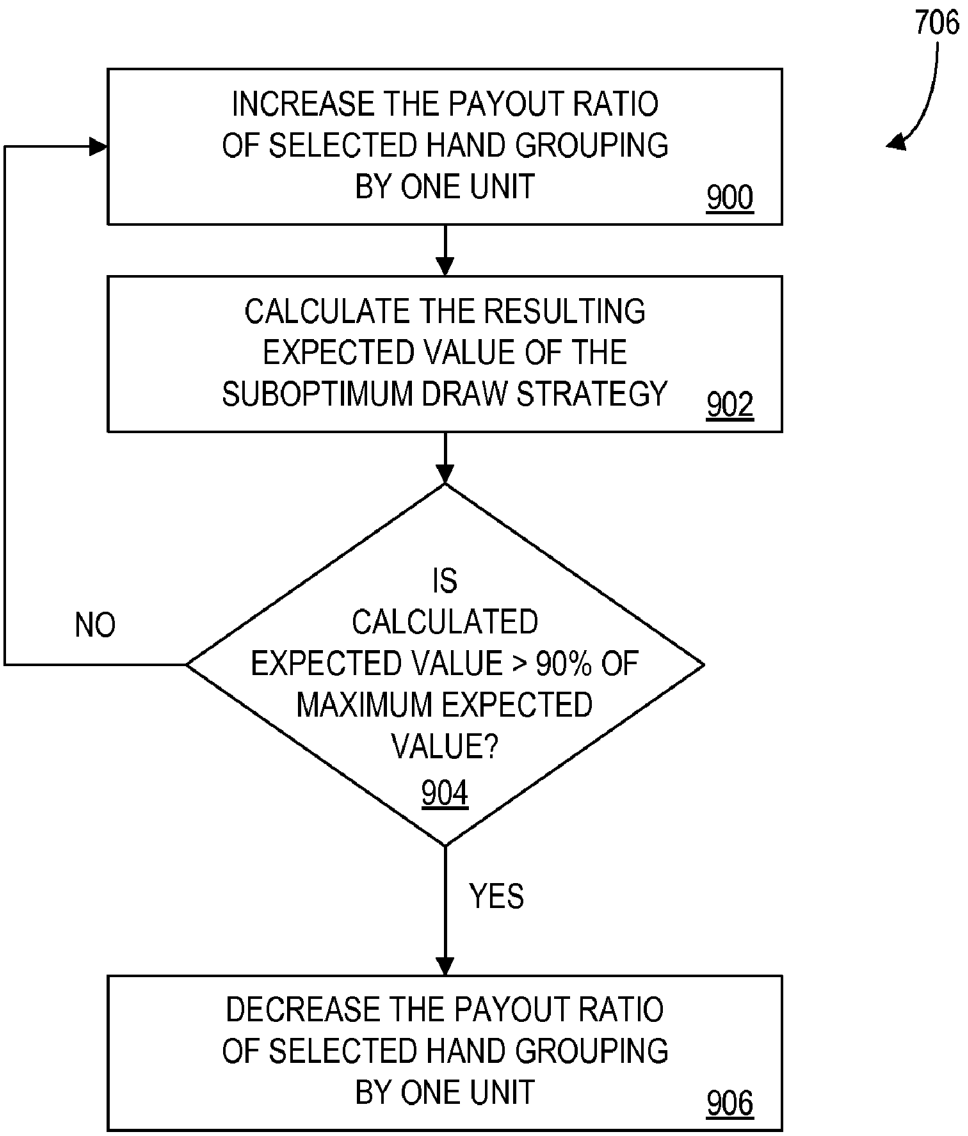
FIG. 9 is a flowchart illustrating a method for increasing a payout ratio of a selected hand grouping.

FIG. 9 illustrates in further detail one embodiment of the step 706 of increasing the payout ratio of the selected hand grouping. In particular, the gaming device increases the payout ratio until the expected value of the suboptimum draw strategy is approximately equal to a desired expected value. The payout ratio of the selected hand grouping is increased by one unit (step 900). In other embodiments, the payout ratio may be increased by a different amount. The resulting expected value of the suboptimum draw strategy is then calculated (step 902). If the calculated expected value is greater than a predetermined threshold (step 904), then the payout ratio of the selected hand grouping is decreased by one unit (step 906). The predetermined threshold is a desired expected value, such as 90% of the maximum expected value. The predetermined threshold may be another predetermined percentage of the maximum expected value. Alternatively, the predetermined threshold need not be based on the maximum expected value. If the calculated expected value is less than the predetermined threshold, then the payout ratio is further increased (step 900) until the desired expected value is exceeded.

The processes described above with reference to FIGS. 7, 8 and 9 may be used to generate tables, such as the table 600 (FIG. 6). A table generated as described below may be used with a gaming device operable to read the payout database. For example, referring again to FIG. 7, a table may be generated by (i) generating each possible initial hand; and (ii) for each initial hand storing indications of the initial hand, the selected hand grouping(s), and the first and second payout ratios. The initial hand is generated in step 702, the hand grouping is selected in step 704, the first payout ratio is determined from a base payout table and the second payout ratio is determined from the step 706.

In addition, those skilled in the art will understand that tables such as the table 400 (FIG. 4) may be readily derived from a table such as the table 600 and a base payout table, such as the table 200. For example, the appropriate base payout ratio of the table 200 is subtracted from a corresponding payout ratio of the table 600 to yield each bonus indicated in the table 400.

In another embodiment of the present invention, a gaming device may be in communication with a server that stores player information, such as player preferences and information about past games played. Such an embodiment allows game play to be customized for a player, and further allows bonuses offered to be customized for a player.

Figure 10:
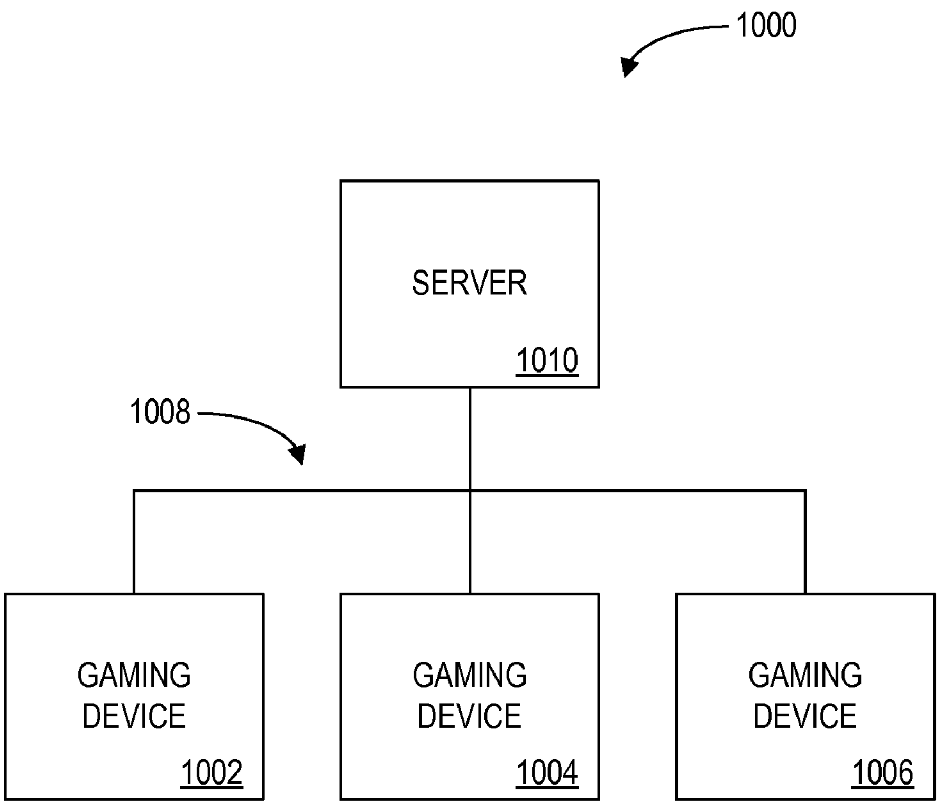
FIG. 10 is a schematic illustration of a network of gaming devices.

Referring to FIG. 10, a system 1000 comprises gaming devices 1002, 1004 and 1006 which are each in communication with a network 1008, and are thereby in communication with a network server 1010. The network 1008 may be any known communication medium, such as an electrical communication medium. Communication with the network server 1010 allows each of the gaming devices 1002, 1004 and 1006 to access player-related information stored on the network server 1010. Those skilled in the art will understand that many types of player-related information may be stored, such as funds and predefined game preferences. Those skilled in the art will also understand that many types of gaming devices may operate in communication with a network server 1010, while many others may operate without any such communication to another device.

Figure 11:
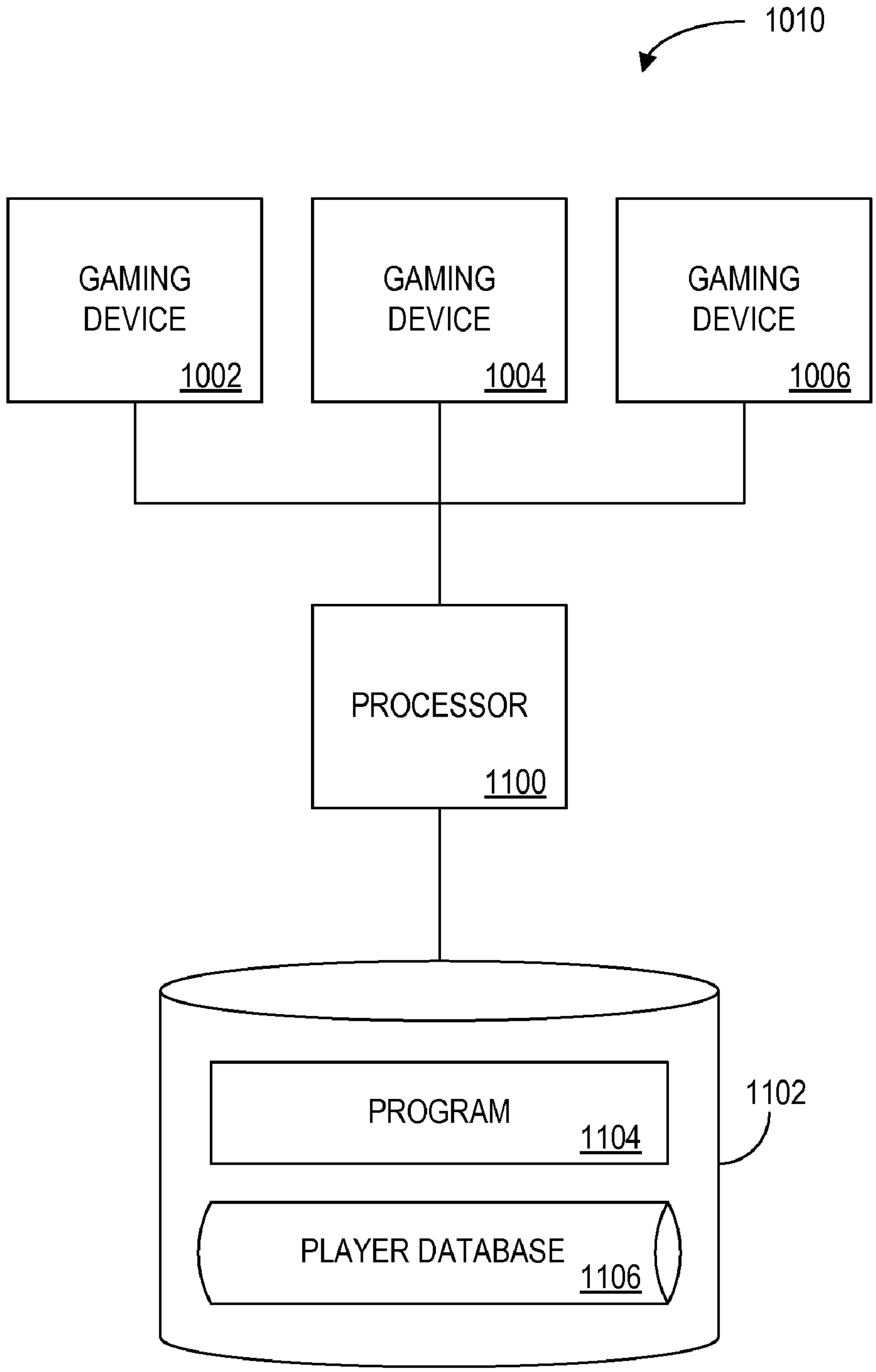
FIG. 11 is a schematic illustration of a network server of the network of FIG. 10.

Referring to FIG. 11, the network server 1010 comprises a processor 1100, such as one or more conventional microprocessors, which is in communication with a data storage device 1102, such as an appropriate combination of magnetic, optical and/or semiconductor memory. The processor 1100 and the storage device 1102 may each be (i) located entirely within a single computer or other computing device, (ii) in communication with each other by a remote communication link, such as a serial port cable, telephone line or radio frequency transceiver, or (iii) a combination thereof. For example, the network server 1010 may comprise one or more computers that are in communication with a remote server computer for maintaining databases.

The storage device 1102 stores (i) a program 1104 for controlling the processor 1100, and (ii) a player database 1106. The processor 1100 performs instructions of the program 1104, thereby operating in accordance with the present invention, and particularly in accordance with the methods described in detail herein. For example, the program 1104 may store data indicative of game rules and game elements. The program 1104 furthermore includes program elements that may be necessary, such as an operating system and "device drivers" for allowing the processor to interface with computer peripheral devices. Appropriate device drivers and other necessary program elements are known to those skilled in the art, and need not be described in detail herein.

Referring to FIG. 12, a table 1200 represents an embodiment of the player database 1106 (FIG. 11). The table 1200 includes entries 1202, 1204 and 1206, each of which defines information for a player that is registered with a casino or other entity. Each entry includes (i) a player identifier 1208 that uniquely identifies the player, (ii) a name 1210 of the player, (iii) an address 1212 of the player, (iv) casino reward points 1214 or other rewards the player has earned (which are typically exchangeable for casino goods and services), (v) bonuses offered 1216 to the player, (vi) bonuses accepted 1218 by the player, and (vii) a bonus acceptance 1220 that is the percentage of offered bonuses that were accepted. The bonuses offered to the player indicates the number of games in which a payout ratio was increased. Similarly, the bonuses accepted by the player indicates the number of games in which the player chose the selected suboptimum strategy. Those skilled in the art will understand that further information may be stored for each player. For example, some casinos may provide a player with an account from which funds may be automatically transferred to and from gaming devices, and a balance of such an account may be stored.

Referring to FIG. 13, a table 1300 represents a record of another embodiment of the player database 1106 (FIG. 11). In such an embodiment, the player database 1106 typically includes a plurality of records, each of which defines information about past games a player has played. A player identifier 1302 uniquely identifies the player. Entries 1304, 1306, 1308, 1310 and 1312 each define a game played by the player. Each entry includes (i) a game identifier 1314 that uniquely identifies the game, (ii) an initial hand 1316 of the game, (iii) a bonus 1318, if any, that is offered, (iv) a draw strategy 1320 that the player selected, (v) an indication 1322 of whether the player selected the optimum draw strategy, (vi) an indication 1324 of whether the player accepted the bonus by selecting the suboptimum draw strategy, and (vii) a payment amount 1326, if any, won by the player.

For example, referring to the entry 1310 of table 1300, game identifier 1314 indicates the specific hand played, in this case "123456789015". The initial hand 1316 contained a small pair (9-diamonds and 9-spades) as well as four cards to a flush (A-spades, 9-spades, 5-spades, J-spades), with the optimum strategy being to draw one card to the spade flush. In order to encourage the player to select a suboptimum strategy, a twenty coin bonus (bonus 1318) was offered for a final hand of four of a kind. This bonus increases the expected value of the second best draw strategy (holding the pair of nines) but does not change the expected value of the optimum strategy because four of a kind is not a possible final hand when holding four cards to a flush. Selected draw strategy 1320 of entry 1310 indicates that the player held the pair of nines, with an indication that this was not the optimum draw strategy ("No") in field 1322. Accepted bonus 1324 is set to "Yes" to indicate that the bonus was successful in encouraging the selection of the suboptimum strategy. Finally, the payment won field 1326 shows that three coins were won by the player since his final hand included three of a kind.

Storing whether the player selected the optimum strategy might be valuable to a casino seeking to gather information regarding the skill level of the player. Highly skilled players might receive a lower level of complimentaries, or receive lower priority service for amenities such as cocktail service. To this end, gaming device 10 could provide a graphical indication on video display 16 that the player is highly skilled, allowing cocktail servers to skip the player if desired. Server 1010 could also signal the service bars of the casino with the location of highly skilled players to avoid expending unnecessary casino resources. Such skilled players might also not be invited to casino tournaments, ensuring that resources are directed towards players who provide the most profits. Conversely, learning that a player is less skilled is also valuable to the casino. Such players might receive a greater number of casino promotional offers to reflect their greater value to the casino.

Figure 14:
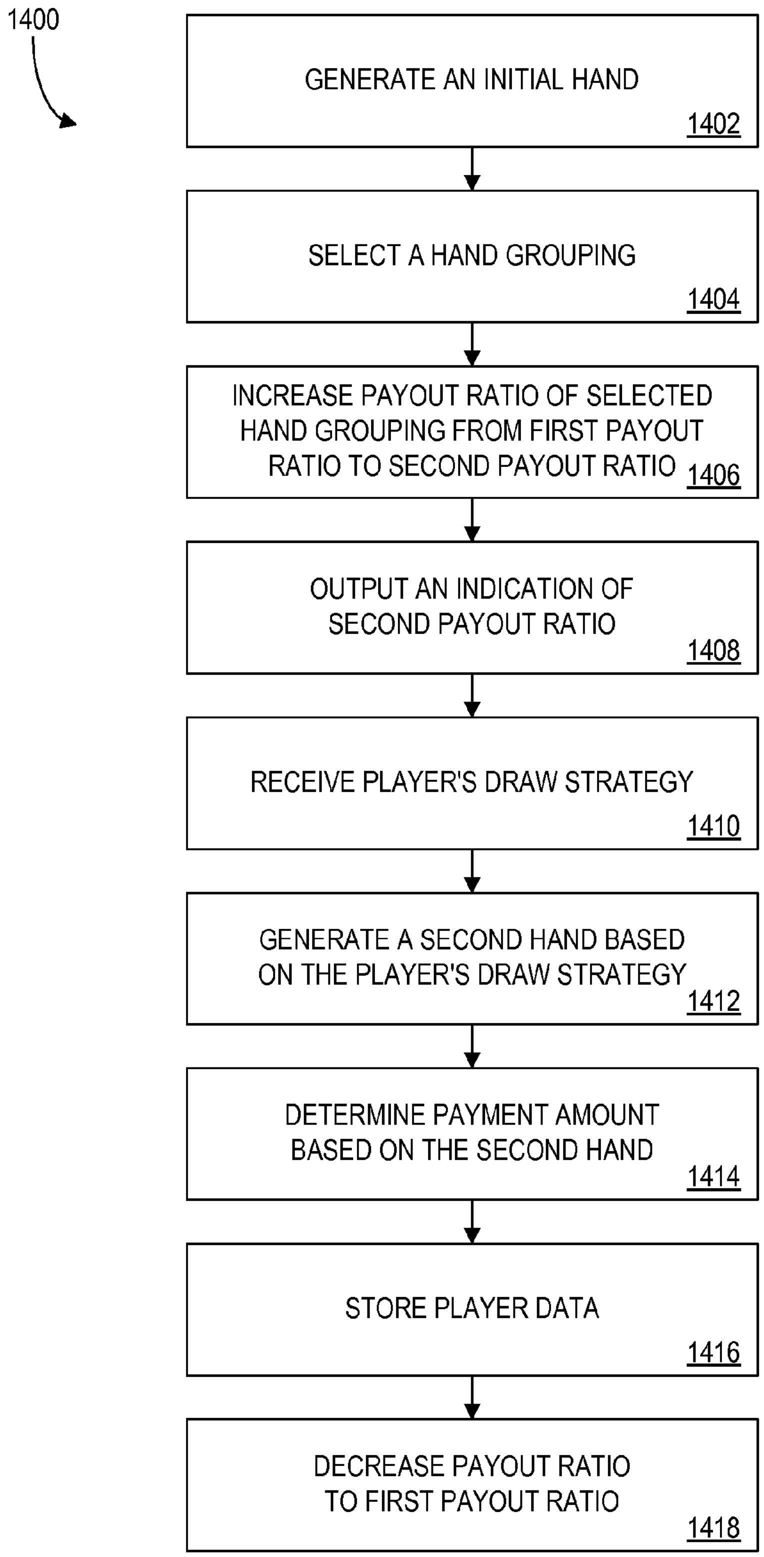
FIG. 14 is a flowchart illustrating another method for directing a gaming device in accordance with the present invention.

Referring to FIG. 14, a process 1400 is performed by a gaming device that is in communication with the network server 1010 (FIG. 10). The process 1400 begins with the start of a game. In response, the gaming device generates an initial hand (step 1402), which defines an optimum draw strategy.

The gaming device selects at least one hand grouping that cannot result from the optimum draw strategy (step 1404), as described above.

The payout ratio of the selected hand grouping is increased from a first payout ratio to a second payout ratio (step 1406). The increase in the payout ratio provides the player with an incentive to select a draw strategy that may result in the selected hand grouping, thereby winning an increased amount due to the increased payout ratio. The gaming device outputs an indication of the second payout ratio (step 1408). For example, the gaming device may display on the video display 16 (FIG. 1) the amount of the second payout ratio, or the amount by which the second payout ratio exceeds the first payout ratio. Thus, the player is made aware of the increased payout ratio and can select his draw strategy accordingly.

The player selects a draw strategy, for example, by operating the player input device 18 (FIG. 1). Signals representing the player's draw strategy are received by the processor 12 (step 1410), and are used to generate a second (final) hand that is based on the player's draw strategy (step 1412). The determination of the payment amount to provide to the player is based on the second hand (step 1414). For example, if the second hand is a "Flush", the payout ratio corresponding to "Flush" is multiplied by the wager amount to determine the payment amount. In particular, if the final hand corresponds to the selected hand grouping, then the second payout ratio is multiplied by the wager amount to determine the payment amount.

Desired player data may be stored (step 1416). For example, the initial hand, optimum draw strategy, selected hand grouping, selected draw strategy, first payout ratio, second payout ratio and payment amount may all be stored in a record, such as represented by the table 1300 (FIG. 13), of the player database 1106. The payout ratio is then decreased back to the first payout ratio (step 1418).

Referring to FIG. 15, a table 1500 represents information that may be stored in the payout database 32 (FIG. 1) in some embodiments of the present invention. In the embodiment illustrated in FIG. 15, the table 1500 defines a bonus table for each of a plurality of initial hands. The table 1500 includes entries 1502, 1504, 1506, 1508 and 1510, each representing a bonus table for an initial hand. Each bonus table in turn defines for each hand grouping a range of bonuses that may be added to the base payout ratio of the hand groupings. Those skilled in the art will understand that each bonus table may define a plurality of corresponding bonus ranges for each hand grouping. A bonus is selected from each bonus range and is added to a base payout ratio for the hand grouping as described above with reference to FIG. 3.

The bonus is selected from the bonus range according to many criteria, such as the bonus acceptance 1220 (FIG. 12) of the player that is stored in player database 1106 (FIG. 11). Typically, a lower bonus is selected if the player has a high bonus acceptance, and a higher bonus is selected if the player has a low bonus acceptance. Thus, players that in the past have not accepted as many bonuses are provided with a higher incentive to accept the bonus. For example, the entry 1504 indicates that if an initial hand is "four cards to a flush", then a bonus from "2" to "3" is added to the base payout ratio for the hand grouping "Three of a kind". Accordingly, if a player has a low bonus acceptance (e.g., less than 40%), the bonus of "3" is selected. Otherwise, the bonus of "2" is selected.

Referring to FIG. 16, the base payout table 200 (FIG. 2) and the table 1500 (FIG. 15) are depicted again to illustrate their use in generating a payout table used to determine a payment amount for a final hand. A payout table 1600 defines a payout ratio for each of a plurality of hand groupings. The entry 208 indicates that a base payout ratio for a "Straight" is "4", and the entry 1502 indicates that a bonus of from "1" to "2" is added to the base payout ratio of a "Straight" if the initial hand is a "Pair". Thus if the initial hand is a "Pair" and the (higher) bonus of "2" is selected (e.g., if the player has a low bonus acceptance), then an entry 1602 indicates that a payout ratio of "6" (4+2=6) applies if the final hand is a "Straight".

Figure 17:
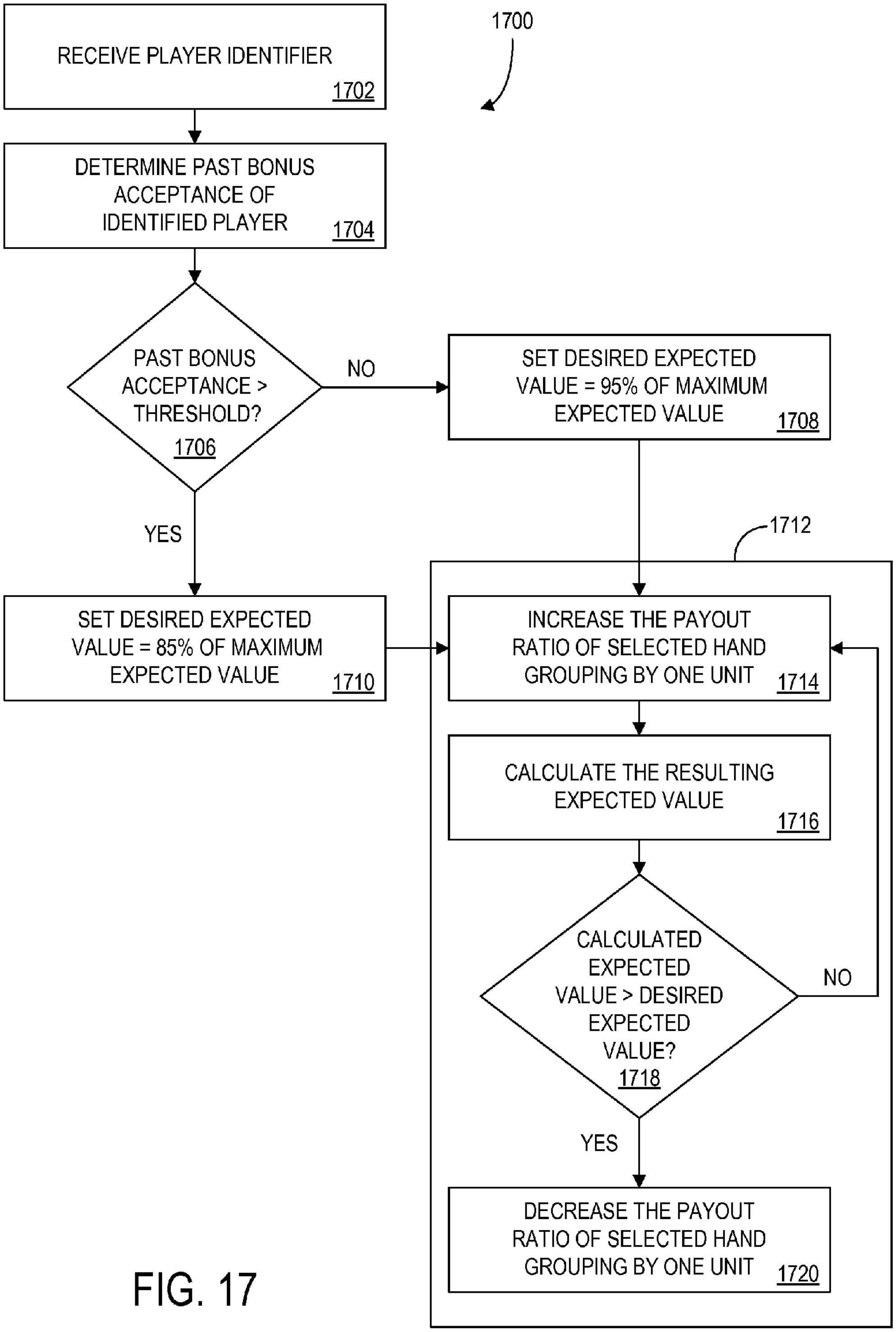
FIG. 17 is a flowchart illustrating another method for increasing a payout ratio of a selected hand grouping.

Referring to FIG. 17, reference numeral 1700 indicates another embodiment of the step 706 of increasing the payout ratio of the selected hand grouping. In particular, the gaming device selects a desired expected value based on the bonus acceptance of the player, and increases the payout ratio until the expected value of the suboptimum draw strategy is approximately equal to a desired expected value.

The gaming device receives a player identifier (step 1702), such as may be read from a player tracking card. Using the player identifier, the gaming device determines the past bonus acceptance of the identified player (step 1704). For example, the gaming device may transmit the player identifier to the network server 1010 (FIGS. 10 and 11), and the network server 1010 in turn transmits the corresponding bonus acceptance from the player database 1106 (FIG. 11). Those skilled in the art will understand that other criteria may be used besides bonus acceptance.

The gaming device in turn determines whether the bonus acceptance exceeds a predetermined threshold (step 1706). For example, the gaming device may determine whether the bonus acceptance exceeds 50%. If not, then at step 1708 the desired expected value is set to a first expected value (e.g., 95% of the maximum expected value). Otherwise, at step 1710 the desired expected value is set to a second expected value (e.g., 85% of the maximum expected value). The second expected value is typically less than the first expected value and need not be based on the maximum expected value. Thus, players with a low bonus acceptance are provided a greater incentive to accept the currently offered bonus.

Reference numeral 1712 indicates a set of steps for increasing the payout ratio of the selected hand grouping until the expected value of the suboptimum draw strategy is approximately equal to a desired expected value. At step 1714, the payout ratio of the selected hand grouping is increased by one unit. In other embodiments, the payout ratio may be increased by a different amount. The resulting expected value of the suboptimum draw strategy is then calculated (step 1716). If the calculated expected value is greater than the desired expected value (step 1718), then the payout ratio of the selected hand grouping is decreased by one unit (step 1720). If the calculated expected value is less than the predetermined threshold, then the payout ratio is further increased (step 1714) until the desired expected value is exceeded.

Referring again to FIGS. 5 and 7, the process 700 is illustrated with reference to an exemplary initial hand included in the entry 402 comprising Jack-diamonds, Jack-spades, Ten-diamonds, 9-spades, 8-diamonds. This initial hand offers many draw strategies such as holding the pair of jacks (J-d, J-s), holding four cards to the straight (J-d, 10-d, 9-s, 8-d), holding three cards to the straight flush (J-d, T-d, 8-d), and holding two cards to the royal flush (J-d, T-d). After generating this initial hand at step 702, processor 12 selects a hand grouping at step 704, the details of which may be illustrated below with reference to FIGS. 8 and 9.

Continuing with the above example, the maximum expected value of all thirty-two draw strategies is determined at Step 800. The highest expected value (1.54 coins for each coin wagered) corresponds to the strategy of holding the pair of jacks and discarding the other three cards. The optimum draw strategy of holding the jacks defines an optimum set of possible second hands at step 802, in this case a pair of jacks or better, two pair, three of a kind, a full house and four of a kind. These are the only possible types of second hands that may result from holding the pair of jacks. At step 804, the suboptimum draw strategy is determined by determining a draw strategy in which the expected value is less than or equal to 50% of the highest expected value, in this case holding four cards to the straight with an expected value of 0.72 coins. The possible second hands of this suboptimum strategy are a pair of jacks or better, and a straight, which together define a suboptimum set of possible second hands. One of these suboptimum possible second hands is selected as a hand grouping at step 806, in this example the straight.

At step 808, the straight hand grouping is compared to hand groupings in the optimum set. Since the optimum set contains no straights there is no overlap, and the process continues to step 816. Since the selected hand grouping of straight is included in the suboptimum set (pair of jacks or better, straight), the process continues to step 706 in which the payment ratio of the straight is increased from four coins (the first payout ratio) to five coins (the second payout ratio) as indicated by step 900. The expected value of the suboptimum draw strategy is recalculated at step 902, and in this example rises from 0.72 to 0.89. Since this calculated expected value is still less than 90% of the maximum expected value (0.89<[90%×1.54] or 1.39), process flow returns to step 900 where the payout ratio is incremented by one unit, rising from five coins to six coins. The recalculated expected value is 1.06 which is still less than 90% of the maximum expected value (1.06<1.39). An additional unit is added to the payout ratio as the process flow returns again to step 900. The calculated expected value of the now seven coin payout is 1.23 which again is less than 90% of the maximum (1.23<1.39). Process flow returns to step 900 where the payout ratio increases to eight coins for the straight. This time the recalculation performed at step 902 reveals that the expected value is greater than 90% of the maximum (1.40>1.39). Process flow thus continues to step 906 when the payout ratio is decreased by one unit, dropping it to seven coins.

Figure 18:
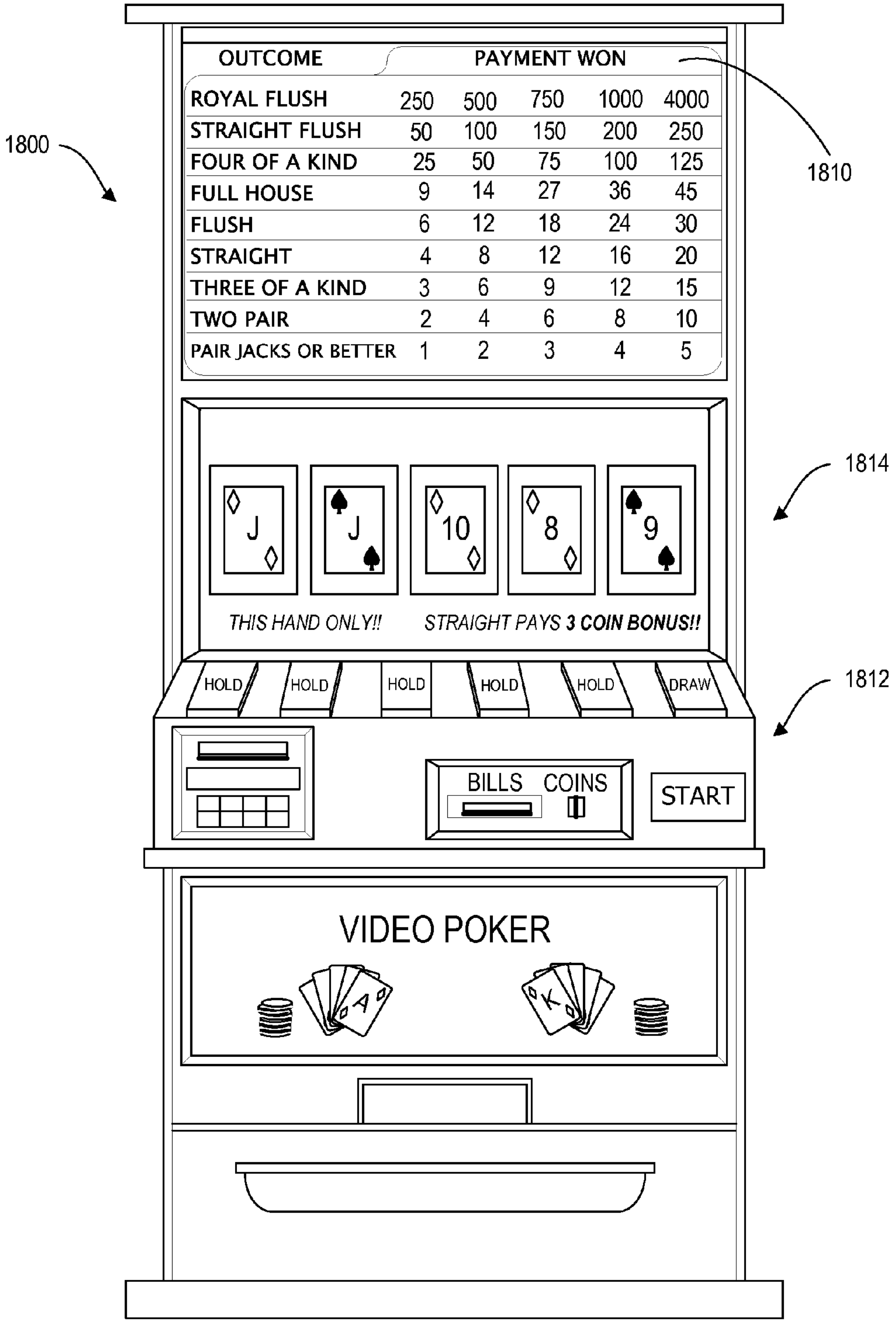
FIG. 18 is a plan view of a gaming device provided in accordance with the present invention.

FIG. 18 depicts a gaming device 1800, which includes a region 1810 showing a set of payments won for different hand groupings and different amounts wagered. The gaming device 1800 also includes controls 1812 that allow a player to make various selections and to transmit commands during game play. A video display 1814 displays a hand of five cards to the player.

Although the present invention has been described with respect to a preferred embodiment thereof, those skilled in the art will note that various substitutions may be made to those embodiments described herein without departing from the spirit and scope of the present invention. For example, those skilled in the art will understand that the present invention is applicable to other video poker varieties such as those that incorporate jokers and/or wild cards. Additionally, other casino games such as video blackjack, pai gow poker, or a blackjack table game, may utilize the processes of the present invention. In a blackjack game, the bonus offered could be higher payouts for hands that the player doubles down on or bonuses for taking insurance. Such an insurance bonus is particularly effective since the machine is able to precisely calculate the probability of a blackjack.

In another blackjack example, a player could be offered a bonus for standing when hitting (or exercising some other option) may be part of a strategy having a higher expected value. For instance, a player may be offered a $5 bonus for winning if the player stands on a count of twelve when the dealer shows a "10".

Bonuses for pai gow poker, keno or bingo play may also be determined as described herein.

Other games may also utilize various processes of the present invention. Some slot machine games, for example, have elements of strategy involved, such as in the bonus games associated with the YAHTZEE® and BATTLESHIP® video slot machines manufactured by MIKOHN GAMING CORPORATION. Games, including slot machine bonus games, having elements of strategy will typically have at least one strategy for play that has a maximum expected value for all possible strategies. For example, in the bonus game of the BATTLESHIP® video slot machine, an optimum strategy for "hitting" a ship would be to "aim" at a position in the middle of the game board. Accordingly, a player may be given an incentive, such as an increased bonus prize, for selecting a position away from the middle of the game board (e.g., in a corner).

Figure 19:
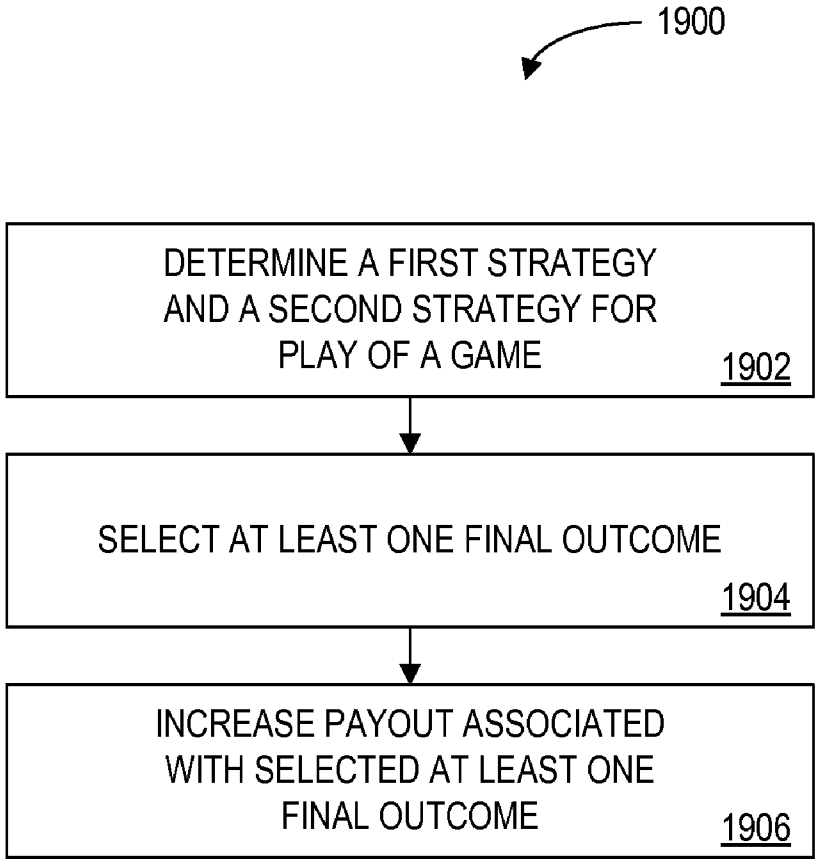
FIG. 19 is a flowchart illustrating one or more embodiments of a method for increasing a payout ratio.

Referring to FIG. 19, a process 1900 that is performed by a controller, such as the processor 12 of a gaming device 10, begins with the controller determining at least a first strategy and a second strategy for play of a game (step 1902). For example, as described above, an initial hand of cards in poker or blackjack may define a plurality of draw strategies. In particular, in a video poker game each of the five cards in the initial hand may be held or not held. In another example, a slot machine bonus game defines a plurality of strategies for play of the bonus game. In particular, in a BATTLESHIP® video slot machine bonus game a player may decide where to "aim" on the game board.

The gaming device selects at least one final outcome of the game that cannot result from the first strategy (step 1904). For example, as described above, one or more winning hands in poker may be defined by a hand grouping (e.g., Flush). In another example, one or more outcomes of a BATTLESHIP® video slot machine bonus game may be selected. The payout ratio of the selected at least one final outcome is increased (step 1906). The increased payout ratio provides the player with an incentive to select a strategy for play of a game that may result in one of the at least one final outcome. Play of the game may then continue, as described variously herein, for example, by outputting an indication of the increased payout ratio to the player and receiving an indication of a player's selected strategy.

According to some embodiments of the present invention, an optimum strategy (e.g., a strategy having the highest expected value) may be only one of various strategies preferred by a player. In other words, it need not be assumed that a given player is more likely to select a strategy that is associated with the highest expected value. In fact, one or more strategies other than an optimum strategy may be preferred by a player, even though the expected value is not as high as that corresponding to an optimum strategy.

In some embodiments, a controller may determine one or more strategies that are preferred by the player (or players) and/or that the player is likely to use, based on, for example, information about the player's prior play, on information about the prior play of one or more other players, on information about the expected value of the strategy, or any combination thereof. For example, in an initial hand of Queen-diamonds, Jack-diamonds, Jack-hearts, Jack-spades, Ten-diamonds even if the draw strategy of holding the three Jacks results in the highest expected value (i.e., even if holding the three Jacks is the optimum draw strategy), it may be determined, based on information about one or more prior games played by the player, that the player is likely to hold the diamonds (e.g., in the hopes of earning a straight, royal flush or flush in diamonds). In one or more embodiments, the controller may determine a probability that a player (or players) will use a particular strategy. The controller may then determine one or more preferred strategies based on the respective probabilities.

In determining whether to select a particular hand grouping, some embodiments of the present invention may refer to the expected value of the strategy preferred by or likely to be selected by the player. For example, if the player was not likely to choose the optimum strategy anyway, in order to be attractive to a player, the increased payout ratio may need only provide an expected value for a suboptimum strategy that approaches (or equals) the expected value of the strategy most likely to be selected. Accordingly, in some embodiments a hand grouping may be selected if the expected value associated with a second draw strategy that may be used to achieve the selected hand grouping is not greater than the expected value associated with a first draw strategy that cannot result in the hand grouping, in which the first draw strategy is a strategy that is likely to be selected by a player.

Figure 20:
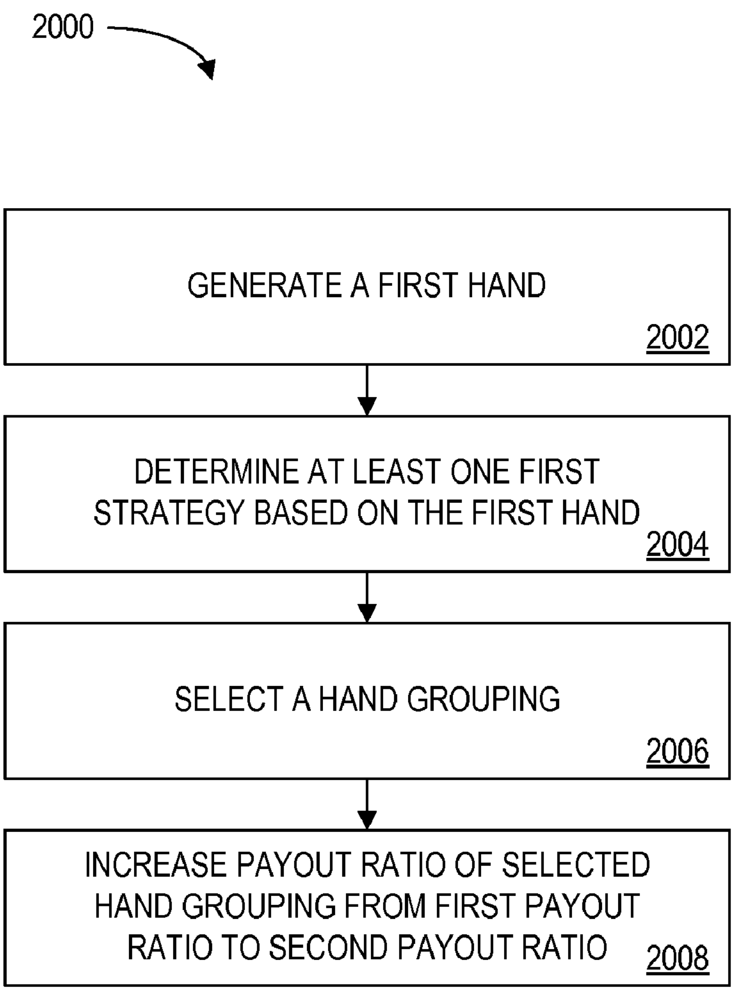
FIG. 20 is a flowchart illustrating one or more embodiments of a method for increasing a payout ratio.

Referring to FIG. 20, a process 2000 that may be performed by a controller such as the gaming device 10 begins with the generating of a first hand of cards (step 2002). The gaming device then determines at least one preferred strategy based on the first hand (step 2004). For example, the gaming device may receive and/or access stored information about prior games played by the player (and/or by other players), including information about decisions made and strategies used by the player. Based on the information, the controller may identify one or more strategies that the player typically uses in a given situation, and may determine a probability or probability score as an indication of the likelihood that the player will use a particular strategy (or strategies) in light of the first hand. In some cases, a player may specifically designate one or more strategies as being preferred. After determining a preferred strategy, the gaming device then selects at least one hand grouping that cannot result from the preferred draw strategy (step 2006). The payout ratio of the selected hand grouping is increased from a first payout ratio to a second payout ratio (step 2008). The increased payout ratio provides the player with an incentive to select a strategy that may result in the selected hand grouping. Play of the game may then continue, as described variously herein, for example, by outputting an indication of the increased payout ratio to the player and receiving an indication of a player's selected strategy. Although the preferred strategy is described above as being associated with a card game, it will be understood that preferred strategies may be determined for other types of games in accordance with various embodiments of the present invention.

In some embodiments of the present invention, the optimum strategy may refer to an optimum basic strategy, which provides the highest expected return among strategies without considering discards.

In one or more embodiments, one or more payouts for a given hand grouping may be dependent on whether the player chose to follow an optimum strategy. For example, the player may be eligible to receive an increased payout for a particular hand grouping only if the player does not follow an optimum strategy. If the player elects an optimum strategy, the increased payout for the particular hand grouping would not be available. In this way, the casino need not be concerned that the expected value of the optimum strategy will be increased as a result of increasing the expected value of a suboptimum strategy.

In some embodiments, a player may be allowed to choose from among two or more payout tables. For example, a first payout table may correspond to an initial payout table. A second payout table may indicate an increased payout ratio for a first hand grouping, thus increasing the expected value of a suboptimum strategy. Alone, the increase in the payout ratio of the first hand grouping may increase the expected value associated with an optimum strategy. However, the second payout table may also indicate that another hand grouping has a reduced payout ratio. The reduction in the payout ratio for the other hand grouping may offset, at least partially, the increased expected value of the optimum strategy. Preferably, the reduction in the payout ratio for the other hand grouping does not offset the increased expected value of the suboptimum strategy.

In some embodiments of the present invention, a player may receive a benefit for using a suboptimum strategy, in addition to or as an alternative to having the payout ratio associated with a particular outcome increased. For example, a player may receive an offer to use a suboptimum strategy and/or may receive a benefit in exchange for agreeing to use a suboptimum strategy and/or using a suboptimum strategy.

In some embodiments of the present invention, a payout ratio may be increased such that a formerly suboptimum strategy has an expected value that is greater than that of an optimum strategy. For example, if it is determined that the player has lost more than a predetermined number of games, that the player has lost more than a predetermined number of consecutive games, that the player has lost more than a predetermined amount of funds, or any combination of such criteria, the payout ratio may be so increased. The expected value of one or more suboptimum strategies may be so increased as a reward or benefit for the player.

In some embodiments, rather than, or in addition to, increasing payout ratios for hand groupings obtainable using a suboptimum strategy, the probabilities of achieving such hand groupings might be increased. In some embodiments, such probabilities may be increased without decreasing the probabilities of any other winning hand groupings occurring. For example, the probabilities of losing hand groupings may be decreased. Probabilities of achieving a particular hand grouping may be increased, for example, by designating one or more cards wild, or by allowing a player extra draws if he first draws a losing hand grouping.

In one example, a player has made a straight flush: King-spades, Queen-spades, Jack-spades, Ten-spades, Nine-spades. In most poker games, the optimum strategy would be to draw no cards. However, if enough other cards are designated as wild cards, then it behooves the player to draw to the royal flush in spades by discarding the Nine-spades and hoping for the As or a wild card to complete the royal flush.

According to one or more embodiments of the present invention, new hand groupings may be defined. For example, instead of any flush receiving a bonus payout, a subset of flushes (e.g., only those flushes where all cards are higher than a "7") could be defined that are eligible to receive bonus payouts. In this way, players may be encouraged to draw for a flush, but the expected value may be less than if all flushes were eligible. As discussed above, in some cases increasing a payout ratio for a particular hand grouping may also increase the expected value of an optimum strategy as well as of the suboptimum strategy. By defining one or more winning hands of a first hand grouping as a second hand grouping, and making the second hand grouping eligible for an increased payout (but not the first hand grouping), a player may be encouraged to adopt a suboptimum strategy in a manner that does not increase the expected value of another strategy that may have resulted in the first hand grouping. For example, a player holds: Ace-clubs, Ten-diamonds, Ten-spades, Six-clubs, Four-hearts. A controller would prefer that the player pursue a suboptimum strategy of discarding every card except the Ace. As discussed above, the controller might increase the payout ratio for the hand grouping of Four-of-a-kind. However, in doing so, the player would also be encouraged to discard every card except the two Ten's, as achieving four Ten's would also result in a Four-of-a-kind. Instead, the controller might create a new hand grouping of four Aces, and offer an increased payout ratio just for that new hand grouping. Of course, in some embodiments the controller may offer increased payouts for any number of hand groupings, whether original or newly defined.

In some embodiments, a player may indicate a suboptimum strategy he wishes to pursue. For example, the player may indicate a number of cards he wishes to hold and/or a number of cards he wishes to discard, in a manner well known in the art. The gaming device may then increase a payout ratio and provide an indication of the increased payout ratio to the player, as described above. The player may then be prompted to indicate whether he will pursue the suboptimum strategy, such as by selecting a "Deal" or "Draw" button. Other means for accepting a player input will be known to those of skill in the art. In some additional embodiments, the controller may store information about the offered payouts and the associated suboptimum strategies as well as an indication of whether the player accepted the offer. In this way, the controller may be able to analyze various suboptimum strategies, increased payouts, and/or combinations thereof, in order to determine which strategies may appeal to a player.

In some embodiments of the present invention, benefits other than merely increasing a payout ration could be offered. For example, possible benefits offered to a player for winning with a selected hand grouping may be an increased payout ratio, a fixed monetary amount, a product, a service, reward points (e.g., frequent flyer miles, complimentary points), long distance minutes, or any combination thereof In one example, in a video poker game, the payout for a straight may be set at four coins plus two free games. In another example, the payout for a royal flush may include a free night's hotel stay. In some embodiments, third-party merchants could arrange to have one or more products and/or services included in enhanced payouts. These and other embodiments may benefit merchants by providing a way to advertise products and services.

In one or more embodiments, particular strategies may be promoted. For example, the casino may decide to promote one or more draw strategies that may lead to a royal flush. In some embodiments, a suboptimum strategy may be selected by a random or pseudo-random process. In some alternative embodiments, a controller may encourage a player (or players) to adopt one or more suboptimum strategies that the player has shown a propensity for in the past. For example, if in prior games the player has indicated a likelihood of drawing to a straight, then the payout ratio associated with straights may be increased.

The offering and/or determination of increased payout ratios during a game might slow the game down, for instance, as the player pauses to consider what a new pay table looks like. In some embodiments, a rate of play by the player may be determined. Increased payout ratios might be offered based on the rate of play.

What is claimed is:

1. A method comprising:

determining via a computational device, based upon an initial hand, a first strategy for play of a game;

selecting, by the computational device, at least one final outcome of the game that cannot result from the first strategy;

causing an offer to be provided to a player the offer being of a bonus to play in accordance with a second strategy wherein the bonus is provided to the player if the game results in the at least one final outcome; and storing game play information comprising the initial hand, the bonus, a strategy employed by the player, and a payment won by the player.

2. The method of claim 1 wherein the first strategy comprises an optimum strategy.

3. The method of claim 1 wherein the game play information further comprises whether or not the player employed the first strategy.

4. The method of claim 3 wherein an attribute of the bonus is determined based upon a rate at which the player employed the first strategy.

5. The method of claim 1 wherein the game play information further comprises a first payout ratio associated with the first strategy and a second payout ratio associated with the second strategy.

6. The method of claim 1 further comprising determining a skill level of the player based upon the game play information.

7. The method of claim 6 further comprising providing a graphical indication of the skill level.

8. The method of claim 6 wherein determining comprises determining the skill level of the player based upon at least one strategy employed by the player.

9. The method of claim 6 further comprising adjusting a comp level of the player based upon the skill level of the player.

10. The method of claim 6 further comprising offering a promotion to the player based upon the skill level of the player.

11. The method of claim 6 further comprising directing the provision of a service to the player based upon the skill level of the player.

12. The method of claim 1 wherein an attribute of the bonus is determined based upon a rate at which the player chooses to employ the second strategy.

13. The method of claim 1 wherein the bonus comprises at least one of a predetermined monetary amount, a product, a service, reward points, and at least one long distance minute.

14. The method of claim 1 wherein the determining is performed on a server.

15. The method of claim 1 wherein the causing the offer to be provided is performed on a server.

16. The method of claim 1 wherein the causing the storing the game play information is performed on a server.

17. A computer readable medium storing instructions configured to direct a processor to perform a method comprising:

determining via a computational device, based upon an initial hand, a first strategy for play of a game;

selecting, by the processor, at least one final outcome of the game that cannot result from the first strategy;

causing an offer to be provided to a player the offer being of a bonus to play in accordance with a second strategy wherein the bonus is provided to the player if the game results in the at least one final outcome; and storing game play information comprising the initial hand, the bonus, a strategy employed by the player, and a payment won by the player.

18. An apparatus comprising:

a processor; and a computer readable medium in communication with the processor and storing instructions configured to direct the processor to perform a method comprising:

determining via a computational device, based upon an initial hand, a first strategy for play of a game;

selecting, by the processor, at least one final outcome of the game that cannot result from the first strategy;

causing an offer to be provided to a player the offer being of a bonus to play in accordance with a second strategy wherein the bonus is provided to the player if the game results in the at least one final outcome; and storing game play information comprising the initial hand, the bonus, a strategy employed by the player, and a payment won by the player.

19. A method comprising:

receiving a player identifier corresponding to a player of a game;

determining, based upon an initial hand, a first strategy for play of the game;

selecting by a computational device at least one final outcome of the game that cannot result from the first strategy;

retrieving player information corresponding to the player identifier;

determining a bonus based, at least in part, upon the player information; and offering the player the bonus to play in accordance with a second strategy wherein the bonus is provided to the player if the game results in the at least one final outcome.

20. The method of claim 19 further comprising requiring the player to place a wager associated with the bonus in order to be eligible for the bonus.

21. A computer readable medium storing instructions configured to direct a processor to perform a method comprising:

receiving a player identifier corresponding to a player of a game;

determining, based upon an initial hand, a first strategy for play of the game;

selecting, by the processor, at least one final outcome of the game that cannot result from the first strategy;

retrieving player information corresponding to the player identifier;

determining a bonus based, at least in part, upon the player information; and offering the player the bonus to play in accordance with a second strategy wherein the bonus is provided to the player if the game results in the at least one final outcome.

22. An apparatus comprising:

a processor; and a computer readable medium in communication with the processor and storing instructions configured to direct the processor to perform a method comprising:

receiving a player identifier corresponding to a player of a game;

determining, based upon an initial hand, a first strategy for play of the game;

selecting, by the processor, at least one final outcome of the game that cannot result from the first strategy;

retrieving player information corresponding to the player identifier;

determining a bonus based, at least in part, upon the player information; and offering a player a bonus to play in accordance with a second strategy wherein the bonus is provided to the player if the game results in the at least one final outcome.

* * * * *